US009845149B2

(12) United States Patent
Tian

(10) Patent No.: US 9,845,149 B2
(45) Date of Patent: Dec. 19, 2017

(54) METHOD AND DEVICE FOR DRIVING ROTOR

(71) Applicant: SHENZHEN UNITED AIRCRAFT TECHNOLOGY CO., LTD, Shenzhen (CN)

(72) Inventor: Gangyin Tian, Shenzhen (CN)

(73) Assignee: SHENZHEN UNITED AIRCRAFT TECHNOLOGY CO., LTD, Futian District, Shenzhen (CN)

( * ) Notice: Subject to any disclaimer, the term of this patent is extended or adjusted under 35 U.S.C. 154(b) by 102 days.

(21) Appl. No.: 15/031,699

(22) PCT Filed: Oct. 23, 2013

(86) PCT No.: PCT/CN2013/085744
§ 371 (c)(1),
(2) Date: Apr. 22, 2016

(87) PCT Pub. No.: WO2015/058363
PCT Pub. Date: Apr. 30, 2015

(65) Prior Publication Data
US 2016/0251076 A1 Sep. 1, 2016

(51) Int. Cl.
*B64C 27/10* (2006.01)
*B64C 27/14* (2006.01)
(Continued)

(52) U.S. Cl.
CPC .............. *B64C 27/10* (2013.01); *B64C 27/12* (2013.01); *B64C 27/14* (2013.01); *B64C 27/80* (2013.01); *F16H 47/02* (2013.01)

(58) Field of Classification Search
None
See application file for complete search history.

(56) References Cited

U.S. PATENT DOCUMENTS

| 4,008,979 A * | 2/1977 | Cooper | B64C 27/80 |
| | | | 244/17.23 |
| 2014/0312177 A1 * | 10/2014 | Gaonjur | B64C 27/24 |
| | | | 244/7 A |

(Continued)

*Primary Examiner* — Jonathan M Dager
*Assistant Examiner* — Garrett F Evans
(74) *Attorney, Agent, or Firm* — Schwabe Williamson & Wyatt, P.C.

(57) ABSTRACT

The embodiments of the present invention disclose a method and a device for driving a rotor. The method comprises: receiving a flight control command; obtaining current rotational states of first motors corresponding to first actuators and the current rotational states of second motors corresponding to second actuators; determining required first rotational states of the first motors according to the flight control command and the current rotational states of the first motors; determining required second rotational states of the second motors according to the flight control command and the current rotational states of the second motors; controlling the first motor to rotate in a corresponding first rotational state so as to drive first blade clamping bodies to twist relative to a lower rotor hub; controlling the second motor to rotate in a corresponding second rotational state so as to drive second blade clamping bodies to twist relative to an upper rotor hub. It can be seen that the present invention can overcome the drawback of a complex driving process present in existing rotor driving methods of rotor driving systems.

7 Claims, 10 Drawing Sheets

(51) Int. Cl.
*B64C 27/12* (2006.01)
*B64C 27/80* (2006.01)
*F16H 47/02* (2006.01)

(56) References Cited

U.S. PATENT DOCUMENTS

2015/0210381 A1* 7/2015 Greenfield ........... G05D 1/0858
 701/3
2015/0210382 A1* 7/2015 Dempsey ................ B64C 27/57
 416/1

* cited by examiner

METHOD AND DEVICE FOR DRIVING ROTOR

TECHNICAL FIELD

The present invention relates to the field of a twin-rotor coaxial autonomous helicopter, and particularly relates to a method and a device for driving a rotor.

BACKGROUND

The so-called twin-rotor coaxial autonomous helicopter may include: an upper rotor and a lower rotor with a same structure, a main shaft constituted by an inner shaft and an outer shaft that rotates reversely relative to the inner shaft, wherein, the upper rotor is mounted at one end of the inner shaft and the lower rotor is mounted at one end of the outer shaft, and the upper rotor is spaced by a certain distance with the lower rotor; wherein, the upper rotor rotates with the inner shaft and the lower rotor rotates with the outer shaft, such that the lower rotor can rotate reversely relative to the upper rotor, and thus the torques generated by the upper and lower rotors can keep balance with each other in a flight state in which the course is unchanged without installation of a tail rotor and a tail beam, and the manipulation of course can be realized by the unbalanced torques generated by the differential of collective pitch of the upper and lower rotors.

In the prior art, the architecture of the rotor driving system enabling course manipulation in a twin-rotor coaxial autonomous helicopter is complex, which in turn results in a complex driving process in the corresponding method for rotor driving.

SUMMARY

Based on the problems described above, embodiments of the present invention disclose a method and a device for driving a rotor so as to overcome the drawback of a complex driving process in existing rotor driving methods of rotor driving systems. The technical solutions are as follows.

In a first aspect, embodiments of the present invention provide a method for driving a rotor, which is applicable to a twin-rotor coaxial autonomous helicopter, the twin-rotor coaxial autonomous helicopter comprises:

an outer shaft 19;

a lower rotor hub 14 fixed at outside of one end of the outer shaft 19;

at least two first blade clamping bodies that are connected with the lower rotor hub 14, each of the first blade clamping bodies can be twisted relative to the lower rotor hub 14 and comprises a first blade clamp 20 and a second blade clamp 22, wherein, the first blade clamp 20 and the second blade clamp 22 cooperatively clamp the lower rotor blade;

an inner shaft 15;

an upper rotor hub 16 fixed at outside of one end of the inner shaft 15;

at least two second blade clamping bodies that are connected with the upper rotor hub 16, each of the second blade clamping bodies can be twisted relative to the upper rotor hub 16 and comprises a third blade clamp 17 and a forth blade clamp 18, wherein, the third blade clamp 17 and the forth blade clamp 18 cooperatively clamp the upper rotor blade;

a box, in which a gear train is housed, comprising an upper cover 26, a box body 27 and a lower cover 1, wherein, the gear train is connected with the outer shaft 19 and the inner shaft 15;

a synchronous belt wheel 7 that is connected with the gear train, wherein the rotation of the synchronous belt wheel 7 drives the gear train to rotate so as to drive the outer shaft 19 and the inner shaft 15 to rotate, and wherein the outer shaft (19) rotates reversely relative to the inner shaft (15), the lower rotor hub 14 is stationary relative to the outer shaft 19 and the upper rotor hub 16 is stationary relative to the inner shaft 15;

a rotor driving system constituted by an upper-rotor driving system and a lower-rotor driving system;

the rotor driving method may comprise:

receiving a command for flight control;

obtaining current rotational states of first motors 9 corresponding to at least three first actuators 8 in the lower-rotor driving system and current rotational states of second motors 49 corresponding to at least three second actuators 58 in the upper-rotor driving system; wherein, each of the first actuators 8 uniquely corresponds to one first motor 9, each of the second actuators 58 uniquely corresponds to one second motor 59, and each of the first motors 9 uniquely corresponds to one current rotational state, each of the second motors 49 uniquely corresponds to one current rotational state;

determining required first rotational states of the first motors 9 according to the command for flight control and the current rotational states of the first motors 9; wherein, each of the first motors 9 uniquely corresponds to one first rotational state;

determining required second rotational states of the second motors 49 according to the command for flight control and the current rotational states of the second motors 49; wherein, each of the second motors 49 uniquely corresponds to one second rotational state;

controlling the first motor 9 to rotate in a corresponding first rotational state, such that a first screw-rod outer sleeve rod 65 of each of the first actuators 8 extends, shortens or remains stationary as rotation of the corresponding first motor 9, so as to drive a nonrotating lower-rotor swashplate 11 in the lower-rotor driving system to tilt towards a specific direction and thus drive a rotating lower-rotor swashplate 24, at least two lower tilted-arm pull rods 35 and at least two blade-clamp tilted arms 13 of the lower rotor to move, enabling twisting of the first blade clamping bodies relative to the lower rotor hub 14; wherein, each of the first actuators 8 comprises a housing; and a first screw-rod outer sleeve rod 65, which can be telescoped upward and downward, with one end located in the housing, the end of each of the first screw-rod outer sleeve rods 65 that protrudes out of the housing is connected with the nonrotating lower-rotor swashplate 11; the rotating lower-rotor swashplate 24 is sleeved on the nonrotating lower-rotor swashplate 11, and the nonrotating lower-rotor swashplate 11 is connected with the rotating lower-rotor swashplate 24 via a lower-rotor joint bearing 57, and the rotating lower-rotor swashplate 24 and the nonrotating lower-rotor swashplate 11 can rotate independently from each other; one end of each of the blade-clamp tilted arms 13 of the lower rotor is fixed on a preset mounting surface of the corresponding first blade clamping body; one end of each of the lower tilted-arm pull rods 35 is connected with the other end of the corresponding blade-clamp tilted arm 13 of the lower rotor; the rotating lower-rotor swashplate 24 is connected with the other end of each of the lower tilted-arm pull rods 35;

controlling the second motor 49 to rotate in a corresponding second rotational state, such that a second screw-rod outer sleeve rod 28 of each of the second actuators 58 extends, shortens or remains stationary as rotation of the corresponding second motor 49, so as to drive a nonrotating upper-rotor swashplate 3 in the upper-rotor driving system to tilt towards a specific direction and thus drive a rotating upper-rotor swashplate 4, at least two upper-rotor steering rod—L arms 47, at least two lower upper-rotor steering rods 45, at least two pull rods 56 within the inner shaft 15, at least two upper upper-rotor steering rods 40, at least two upper tilted-arm pull rods 41 and at least two blade-clamp tilted arms 42 of the upper rotor to move, enabling twisting of the second blade clamping bodies relative to the upper rotor hub 16; wherein, each of the second actuators 58 comprises a housing; and a second screw-rod outer sleeve rod 28, which can be telescoped upward and downward, with one end located in the housing, the end of each of the second screw-rod outer sleeve rods 28 that protrudes out of the housing is connected with the nonrotating upper-rotor swashplate 3; the nonrotating upper-rotor swashplate 3 is connected with the rotating upper-rotor swashplate 4 and the rotating upper-rotor swashplate 4 and the nonrotating upper-rotor swashplate 3 can rotate independently from each other; one end of each of the blade-clamp tilted arms 42 of the upper rotor is fixed on a preset mounting surface of the corresponding second blade clamping body; one end of each of the upper tilted-arm pull rods 41 is connected with the other end of the corresponding blade-clamp tilted arm 42 of the upper rotor; one end of each of the upper upper-rotor steering rods 40 is connected with the other end of the corresponding upper tilted-arm pull rod 41; an upper pull-rod plug 39 that is connected with the other end of each of the upper upper-rotor steering rods 40; one end of each of the pull rods 56 is connected with the corresponding upper upper-rotor steering rod 40 by the upper pull-rod plug 39; one end of the lower pull-rod plug 64 is connected with the other end of the pull rod 56; one end of each of the lower upper-rotor steering rods 45 is connected with the lower pull-rod plug 64 and is connected with the other end of the corresponding pull rod 56 by the lower pull-rod plug 64; one end of each of the upper-rotor steering rod—L arms 47 is connected with the other end of the corresponding lower upper-rotor steering rod 45; the rotating upper-rotor swashplate 4 is connected with the other end of the upper-rotor steering rod—L arms 47;

wherein, under action of at least two lower-rotor steering assemblies in the lower-rotor driving system, the rotation of the lower rotor hub 14 with the outer shaft 19 drives the rotating lower-rotor swashplate 24 to rotate; under action of the upper-rotor steering rod—L arms 47 and the lower upper-rotor steering rods 45, the rotation of the upper rotor hub 16 with the inner shaft 15 drives the rotating upper-rotor swashplate 4 to rotate; wherein, one end of each of the lower-rotor steering assemblies is fixed on the lower rotor hub 14 and the other end is fixed on the rotating lower-rotor swashplate 24;

the nonrotating lower-rotor swashplate 11 is not rotatable with the rotating lower-rotor swashplate 24 under action of a first anti-rotation rod 25 and a first sliding block 44 in the lower-rotor driving system; the nonrotating upper-rotor swashplate 3 is not rotatable with the rotating upper-rotor swashplate 4 under action of a second anti-rotation rod 29 and a second sliding block 30 in the upper-rotor driving system; wherein, one end of the first anti-rotation rod 25 is fixed on the upper cover 26 and the other end is provided with a through hole, and the first sliding block 44 is arranged on the nonrotating lower-rotor swashplate 11 and penetrates into the through hole of the first anti-rotation rod 25; one end of the second anti-rotation rod 29 is fixed on a actuator mounting base 2 and the other end is provided with a through hole, and the second sliding block 30 is arranged on the nonrotating upper-rotor swashplate 3 and penetrates into the through hole of the second anti-rotation rod 29.

Preferably, the command for flight control may be:

a takeoff command, a hover command, a forward command, a reverse command, a left steering command or a right steering command.

Preferably, the step of determining required first rotational states of the first motors 9 according to the command for flight control and the current rotational states of the first motors 9 may comprise:

determining a current twist angle by which each of the first blade clamping bodies rotates relative to the lower rotor hub 14 according to the current rotational states of the first motors 9; wherein, each of the first blade clamping bodies uniquely corresponds to one current twist angle;

determining a required first twist angle by which each of the first blade clamping bodies rotates relative to the lower rotor hub 14 according to the command for flight control and the current twist angle by which each of the first blade clamping bodies rotates relative to the lower rotor hub 14; wherein, each of the first blade clamping bodies uniquely corresponds to one first twist angle; and determining a required first rotational state of each of the first motors 9 according to the required first twist angle by which each of the first blade clamping bodies rotates relative to the lower rotor hub 14.

Accordingly, the step of determining required second rotational states of the second motors 49 according to the command for flight control and the current rotational states of the second motors 49 may comprise:

determining a current twist angle by which each of the second blade clamping bodies rotates relative to the upper rotor hub 16 according to the current rotational states of the second motors 49; wherein, each of the second blade clamping bodies uniquely corresponds to one current twist angle;

determining a required second twist angle by which each of the second blade clamping bodies rotates relative to the upper rotor hub 16 according to the command for flight control and the current twist angle by which each of the second blade clamping bodies rotates relative to the upper rotor blade 16; wherein, each of the second blade clamping bodies uniquely corresponds to one second twist angle; and determining a required second rotational state of each of the second motors 49 according to the required second twist angle by which each of the second blade clamping bodies rotates relative to the upper rotor hub 16.

Preferably, the command for flight control is sent by a remote controller.

Preferably, the command for flight control is sent through a ground control station.

In a second aspect, embodiments of the present invention provide a rotor driving device, which is applicable to a twin-rotor coaxial autonomous helicopter, the twin-rotor coaxial autonomous helicopter comprises:

an outer shaft 19;

a lower rotor hub 14 fixed at outside of one end of the outer shaft 19;

at least two first blade clamping bodies that are connected with the lower rotor hub 14, each of the first blade clamping bodies can be twisted relative to the lower rotor hub 14 and comprises a first blade clamp 20 and a second blade clamp 22, wherein, the first blade clamp 20 and the second blade clamp 22 cooperatively clamp the lower rotor blade;

an inner shaft 15;

an upper rotor hub 16 fixed at outside of one end of the inner shaft 15;

at least two second blade clamping bodies that are connected with the upper rotor hub 16, each of the second blade clamping bodies can be twisted relative to the upper rotor hub 16 and comprises a third blade clamp 17 and a forth blade clamp 18, wherein, the third blade clamp 17 and the forth blade clamp 18 cooperatively clamp the upper rotor blade;

a box, in which a gear train is housed, comprising an upper cover 26, a box body 27 and a lower cover 1, wherein, the gear train is connected with the outer shaft 19 and the inner shaft 15;

a synchronous belt wheel 7 that is connected with the gear train, wherein the rotation of the synchronous belt wheel drives the gear train to rotate so as to drive the outer shaft 19 and the inner shaft 15 to rotate, and wherein the outer shaft (19) rotates reversely relative to the inner shaft (15), the lower rotor hub 14 is stationary relative to the outer shaft 19 and the upper rotor hub 16 is stationary relative to the inner shaft 15; and a rotor driving system constituted by an upper-rotor driving system and a lower-rotor driving system.

The rotor driving device may comprise:

a command receiving module for receiving a command for flight control;

a current state obtaining module for obtaining current rotational states of first motors 9 corresponding to at least three first actuators 8 in the lower-rotor driving system and current rotational states of second motors 49 corresponding to at least three second actuators 58 in the upper-rotor driving system; wherein, each of the first actuators 8 uniquely corresponds to one first motor 9, each of the second actuators 58 uniquely corresponds to one second motor 59, and each of the first motors 9 uniquely corresponds to one current rotational state, each of the second motors 49 uniquely corresponds to one current rotational state;

a first rotational state determining module for determining required first rotational states of the first motors 9 according to the command for flight control and the current rotational states of the first motors 9; wherein, each of the first motors 9 uniquely corresponds to one first rotational state;

a second rotational state determining module for determining required second rotational states of the second motors 49 according to the command for flight control and the current rotational states of the second motors 49; wherein, each of the second motors 49 uniquely corresponds to one second rotational state;

a first control module for controlling the first motor 9 to rotate in a corresponding first rotational state, such that a first screw-rod outer sleeve rod 65 of each of the first actuators 8 extends, shortens or remains stationary as rotation of the corresponding first motor 9 so as to drive a nonrotating lower-rotor swashplate 11 in the lower-rotor driving system to tilt towards a specific direction and thus drive a rotating lower-rotor swashplate 24, at least two lower tilted-arm pull rods 35 and at least two blade-clamp tilted arms 13 of the lower rotor to move, enabling twisting of the first blade clamping bodies relative to the lower rotor hub 14; wherein, each of the first actuators 8 may comprise a housing; and a first screw-rod outer sleeve rod 65, which can be telescoped upward and downward, with one end located in the housing, the end of each of the first screw-rod outer sleeve rods 65 that protrudes out of the housing is connected with the nonrotating lower-rotor swashplate 11; the rotating lower-rotor swashplate 24 is sleeved on the nonrotating lower-rotor swashplate 11, and the nonrotating lower-rotor swashplate 11 is connected with the rotating lower-rotor swashplate 24 via a lower-rotor joint bearing 57, and the rotating lower-rotor swashplate 24 and the nonrotating lower-rotor swashplate 11 can rotate independently from each other; one end of each of the blade-clamp tilted arms 13 of the lower rotor is fixed on a preset mounting surface of the corresponding first blade clamping body; one end of each of the lower tilted-arm pull rods 35 is connected with the other end of the corresponding blade-clamp tilted arm 13 of the lower rotor; the rotating lower-rotor swashplate 24 is connected with the other end of each of the lower tilted-arm pull rods 35;

a second control module for controlling the second motor 49 to rotate in a corresponding second rotational state, such that a second screw-rod outer sleeve rod 28 of each of the second actuators 58 extends, shortens or remains stationary as rotation of the corresponding second motor 49 so as to drive a nonrotating upper-rotor swashplate 3 in the upper-rotor driving system to tilt towards a specific direction and thus drive a rotating upper-rotor swashplate 4, at least two upper-rotor steering rod—L arms 47, at least two lower upper-rotor steering rods 45, at least two pull rods 56 within the inner shaft 15, at least two upper upper-rotor steering rods 40, at least two upper tilted-arm pull rods 41 and at least two blade-clamp tilted arms 42 of the upper rotor to move, enabling twisting of the second blade clamping bodies relative to the upper rotor hub 16; wherein, each of the second actuators 58 may comprise a housing; and a second screw-rod outer sleeve rod 28, which can be telescoped upward and downward, with one end in the housing, the end of each of the second screw-rod outer sleeve rods 28 that protrudes out of the housing is connected with the nonrotating upper-rotor swashplate 3; the nonrotating upper-rotor swashplate 3 is connected with the rotating upper-rotor swashplate 4 and the rotating upper-rotor swashplate 4 and the nonrotating upper-rotor swashplate 3 can rotate independently from each other; one end of each of the blade-clamp tilted arms 42 of the upper rotor is fixed on a preset mounting surface of the corresponding second blade clamping body; one end of each of the upper tilted-arm pull rods 41 is connected with the other end of the corresponding blade-clamp tilted arm 42 of the upper rotor; one end of each of the upper upper-rotor steering rods 40 is connected with the other end of the corresponding upper tilted-arm pull rod 41; an upper pull-rod plug 39 that is connected with the other end of each of the upper upper-rotor steering rods 40; one end of each of the pull rods (56) is connected with the corresponding upper upper-rotor steering rod 40 by the upper pull-rod plug 39; one end of the lower pull-rod plug 64 is connected with the other end of the pull rod 56; one end of each of the lower upper-rotor steering rods 45 is connected with the lower pull-rod plug 64, and is connected with the other end of the corresponding pull rod 56 by the lower pull-rod plug 64; one end of each of the upper-rotor steering rod—L arms 47 is connected with the other end of the corresponding lower upper-rotor steering rod 45; the rotating upper-rotor swashplate 4 is connected with the other end of the upper-rotor steering rod—L arms 47;

wherein, under action of at least two lower-rotor steering assemblies in the lower-rotor driving system, the rotation of the lower rotor hub 14 with the outer shaft 19 drives the rotating lower-rotor swashplate 24 to rotate; under action of the upper-rotor steering rod—L arms 47 and the lower upper-rotor steering rods 45, the rotation of the upper rotor hub 16 with the inner shaft 15 drives the rotating upper-rotor swashplate 4 to rotate; wherein, one end of each of the lower-rotor steering assemblies is fixed on the lower rotor hub 14 and the other end is fixed on the rotating lower-rotor swashplate 24;

the nonrotating lower-rotor swashplate 11 is not rotatable with the rotating lower-rotor swashplate 24 under action of a first anti-rotation rod 25 and a first sliding block 44 in the lower rotor driving system; the nonrotating upper-rotor swashplate 3 is not rotatable with the rotating upper-rotor swashplate 4 under action of a second anti-rotation rod 29 and a second sliding block 30 in the upper-rotor driving system; wherein, one end of the first anti-rotation rod 25 is fixed on the upper cover 26 and the other end is provided with a through hole, and the first sliding block 44 is arranged on the nonrotating lower-rotor swashplate 11 and penetrates into the through hole of the first anti-rotation rod 25; one end of the second anti-rotation rod 29 is fixed on a actuator mounting base 2 and the other end is provided with a through hole, and the second sliding block 30 is arranged on the nonrotating upper-rotor swashplate 3 and penetrates into the through hole of the second anti-rotation rod 29.

Preferably, the first rotational state determining module may comprise:

a current twist angle determining unit for determining a current twist angle by which each of the first blade clamping bodies rotates relative to the lower rotor hub 14 according to the current rotational states of the first motors 9; wherein, each of the first blade clamping bodies uniquely corresponds to one current twist angle;

a first twist angle determining unit for determining a required first twist angle by which each of the first blade clamping bodies rotates relative to the lower rotor hub 14 according to the command for flight control and the required current twist angle by which each of the first blade clamping bodies rotates relative to the lower rotor hub 14; wherein, each of the first blade clamping bodies uniquely corresponds to the first current twist angle; and a first rotational state determining unit for determining a required first rotational state of each of the first motors 9 according to the required first twist angle by which each of the first blade clamping bodies rotates relative to the lower rotor hub 14.

Accordingly, the second rotational state determining module may comprise:

a current angle determining unit for determining a current twist angle by which each of the second blade clamping bodies rotates relative to the upper rotor hub 16 according to the current rotational states of the second motors 49; wherein, each of the second blade clamping bodies uniquely corresponds to one current twist angle;

a second twist angle determining unit for determining a required second twist angle by which each of the second blade clamping bodies rotates relative to the upper rotor hub 16 according to the command for flight control and the current twist angle by which each of the second blade clamping bodies rotates relative to the upper rotor blade 16; wherein, each of the second blade clamping bodies uniquely corresponds to one second twist angle; and a second rotational state determining unit for determining a required second rotational state of each of the second motors 49 according to the required second twist angle by which each of the second blade clamping bodies rotates relative to the upper rotor hub 16.

In an embodiment of the present invention, a method for driving a rotor may comprise: receiving a command for flight control; obtaining current rotational states of first motors 9 corresponding to at least three first actuators 8 and current rotational states of second motors 49 corresponding to at least three second actuators 58; determining required first rotational states of the first motors 9 according to the command for flight control and the current rotational states of the first motors 9; determining required second rotational states of the second motors 49 according to the command for flight control and the current rotational states of the second motors 49; controlling the first motor 9 to rotate in a corresponding first rotational state, such that a first screw-rod outer sleeve rod 65 of each of the first actuators 8 extends, shortens or remains stationary with the rotation of the corresponding first motor 9 so as to drive a nonrotating lower-rotor swashplate 11 to tilt toward a specific direction and thus a rotating lower-rotor swashplate 24, at least two lower tilted-arm pull rods 35 and at least two blade-clamp tilted arms 13 of the lower rotor to move, enabling the first blade clamping bodies to be twisted relative to the lower rotor hub 14; controlling the second motor 49 to rotate in a corresponding second rotational state, such that a second screw-rod outer sleeve rod 28 of each of the second actuators 58 extends, shortens or remains stationary with the rotation of the corresponding second motor 49 so as to drive a nonrotating upper-rotor swashplate 3 to tilt towards a specific direction and thus drive a rotating upper-rotor swashplate 4, at least two upper-rotor steering rod—L arms 47, at least two lower upper-rotor steering rods 45, at least two pull rods 56 within the inner shaft 15, at least two upper upper-rotor steering rods 40, at least two upper tilted-arm pull rods 41 and at least two blade-clamp tilted arms 42 of the upper rotor to move, enabling the second blade clamping bodies to be twisted relative to the upper rotor hub 16. As such, with the method for driving a rotor provided by the embodiments of the present invention, the various components that are located between the screw-rod outer sleeve rod and the blade clamping body can operate jointly by controlling the rotary angle of the rotors to control the extending and shortening of the screw-rod outer sleeve rod in the actuator to which the rotor is connected, such that various elements between the screw-rod outer sleeve rod and a blade clamping body can be linked to drive the blade clamping body to twist relative to the hub, thus reducing the complexity of the rotor driving process and overcoming the drawback of complex driving process present in existing rotor driving methods of rotor driving systems.

BRIEF DESCRIPTION OF THE DRAWINGS

In order to describe embodiments of the present invention or technical solutions in prior art more clearly, drawings used for embodiments of the present invention or the prior art will be described briefly below. It is obvious that the drawings set forth below are for only some embodiments of the present invention, and those skilled in the art can also obtain further drawings based on these drawings without creative efforts.

DETAILED DESCRIPTION

The present invention will be further described in detail with reference to the drawings and the embodiments so as to make the objects, technical solutions and advantages of the present invention more clear and easier to understand. Obviously, the embodiments descried are only a part of embodiments of the present invention, and not all the embodiments thereof. All the other embodiments obtained by an ordinary skilled in the art without any creative effort based on the embodiments of the present invention fall into the protection scope of the present invention.

In order to overcome the drawback of a complex driving process present in existing rotor driving methods of rotor driving systems, the embodiments of the present invention provide a method and device for driving a rotor.

It should be noted that the method for driving a rotor provided by the embodiments of the present invention is applicable to a twin-rotor coaxial autonomous helicopter.

Figure 1:
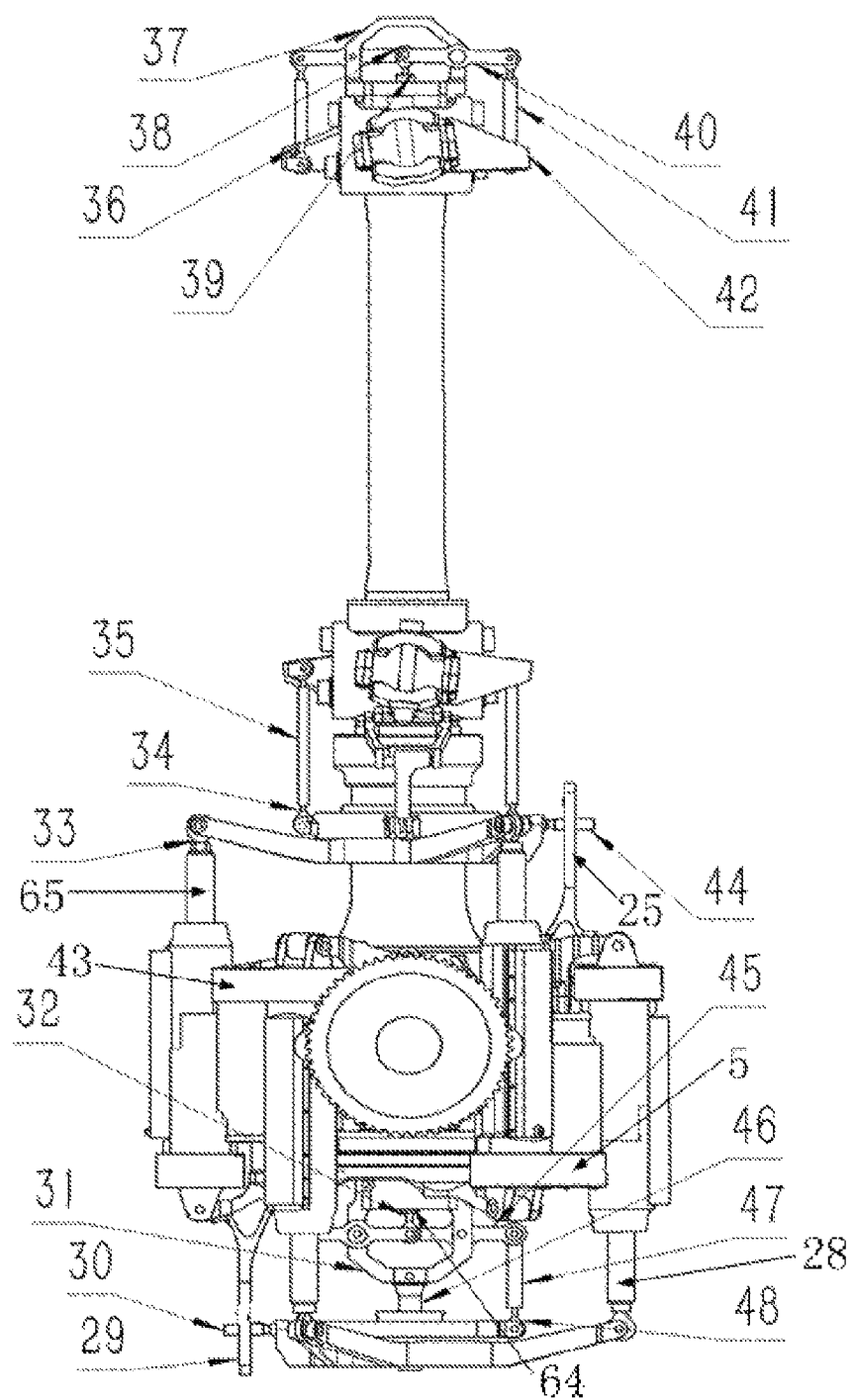
FIG. 1 is a front view of a rotor driving system in a twin-rotor coaxial autonomous helicopter to which a method for driving a rotor according to an embodiment of the present invention is applicable.
Figure 2:
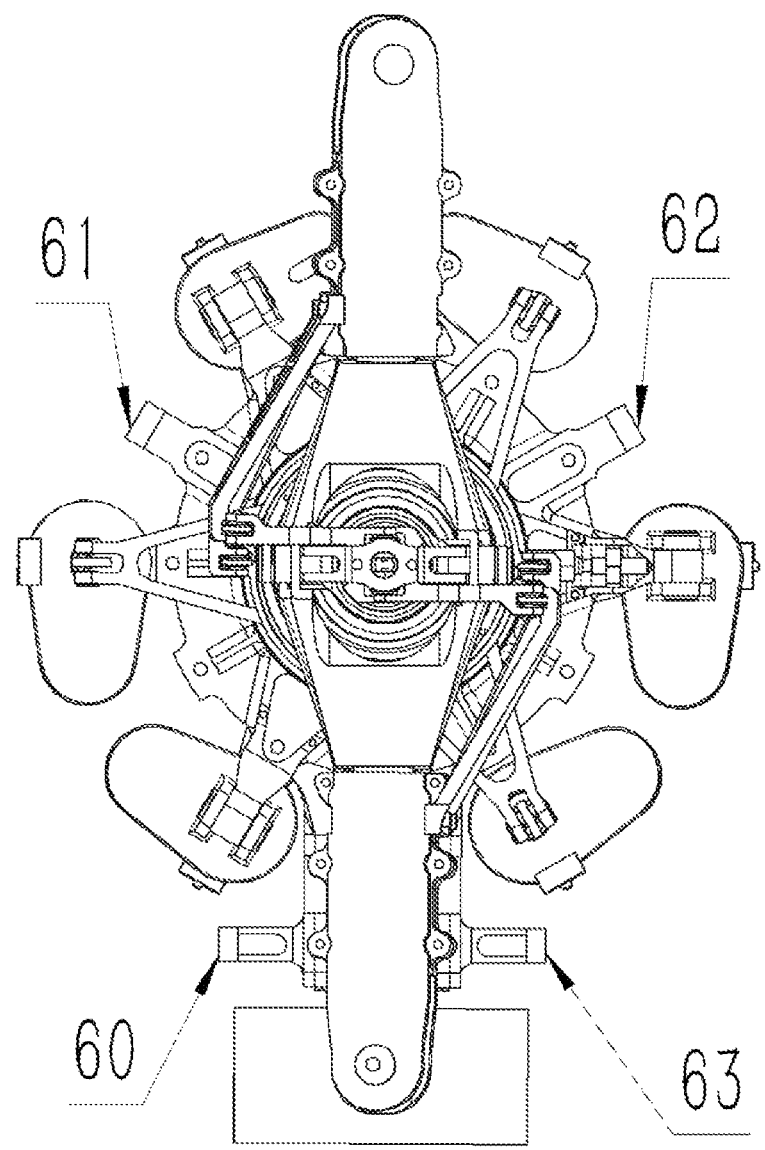
FIG. 2 is a top view of a rotor driving system in a twin-rotor coaxial autonomous helicopter to which a method for driving a rotor provided by an embodiment of the present invention is applicable.
Figure 3:
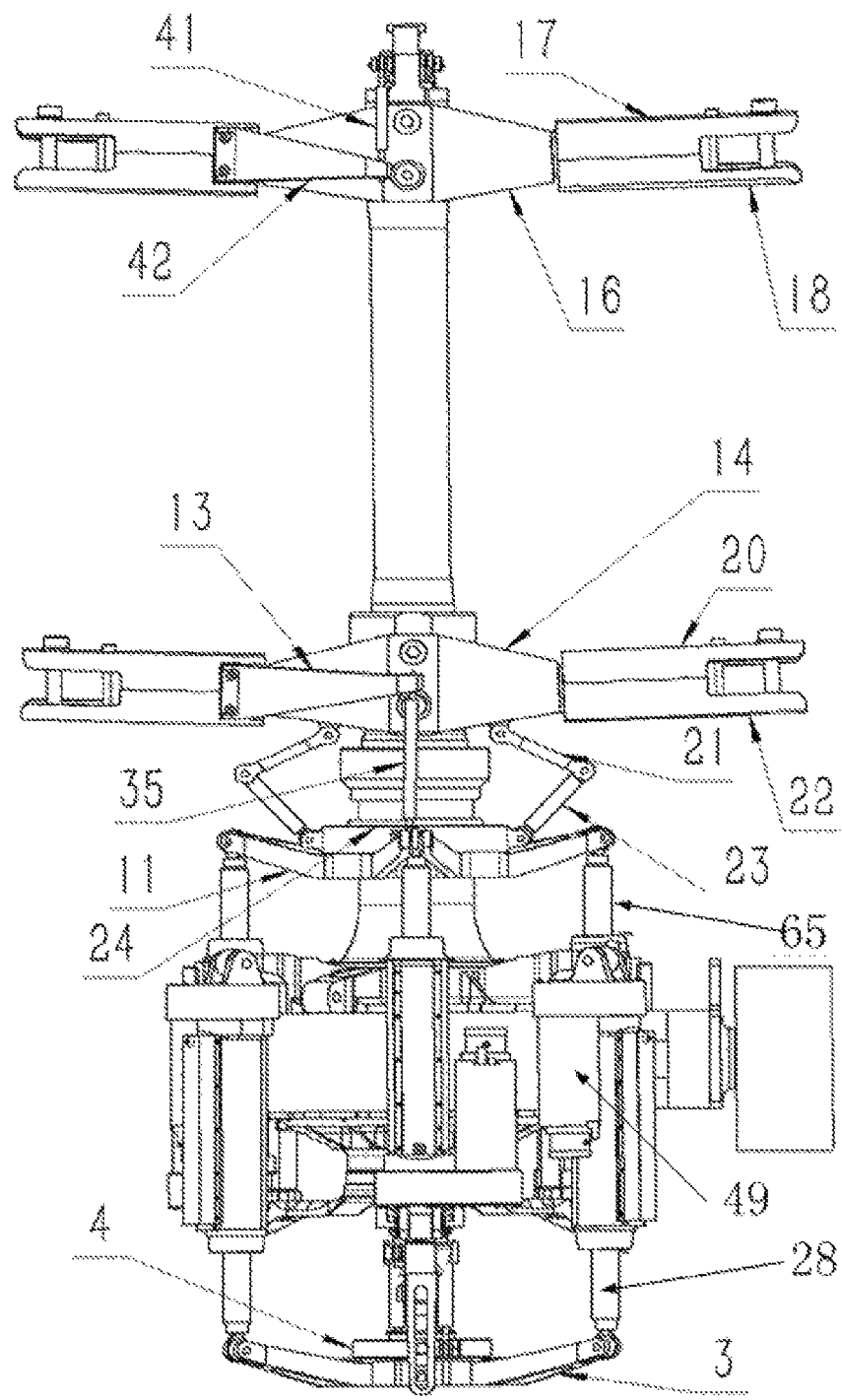
FIG. 3 is a left view of a rotor driving system in a twin-rotor coaxial autonomous helicopter to which a method for driving a rotor provided by an embodiment of the present invention is applicable.
Figure 4:
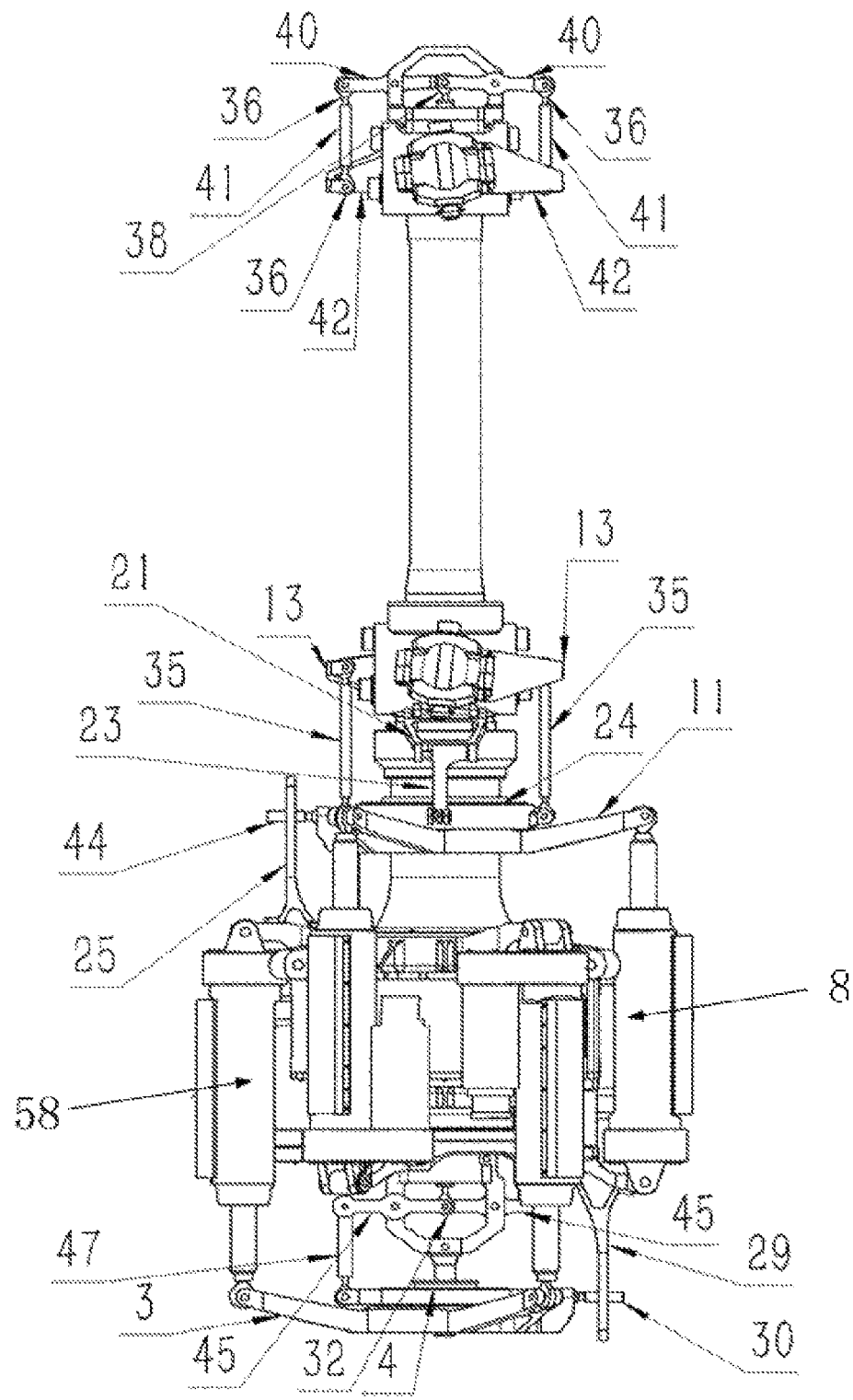
FIG. 4 is a back view of a rotor driving system in a twin-rotor coaxial autonomous helicopter to which a method for driving a rotor provided by an embodiment of the present invention is applicable.
Figure 5:
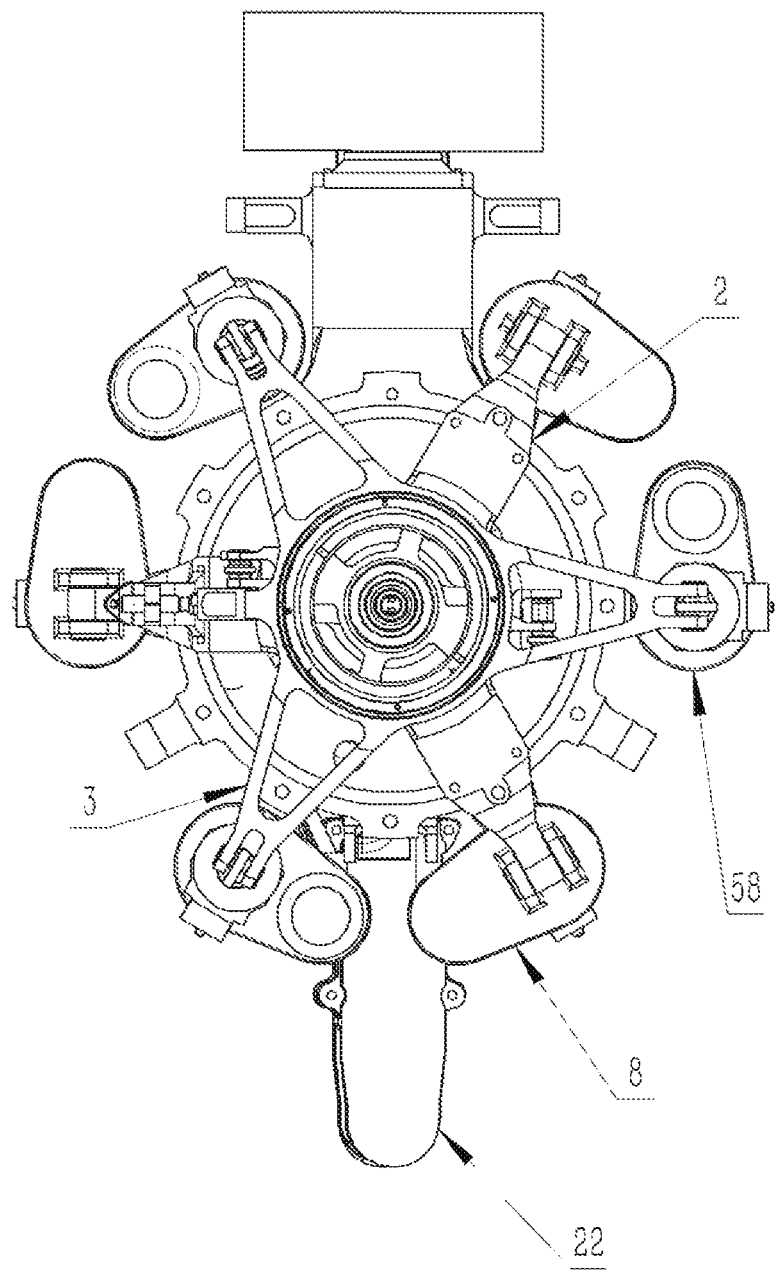
FIG. 5 is a bottom view of a rotor driving system in a twin-rotor coaxial autonomous helicopter to which a method for driving a rotor provided by an embodiment of the present invention is applicable.
Figure 6:
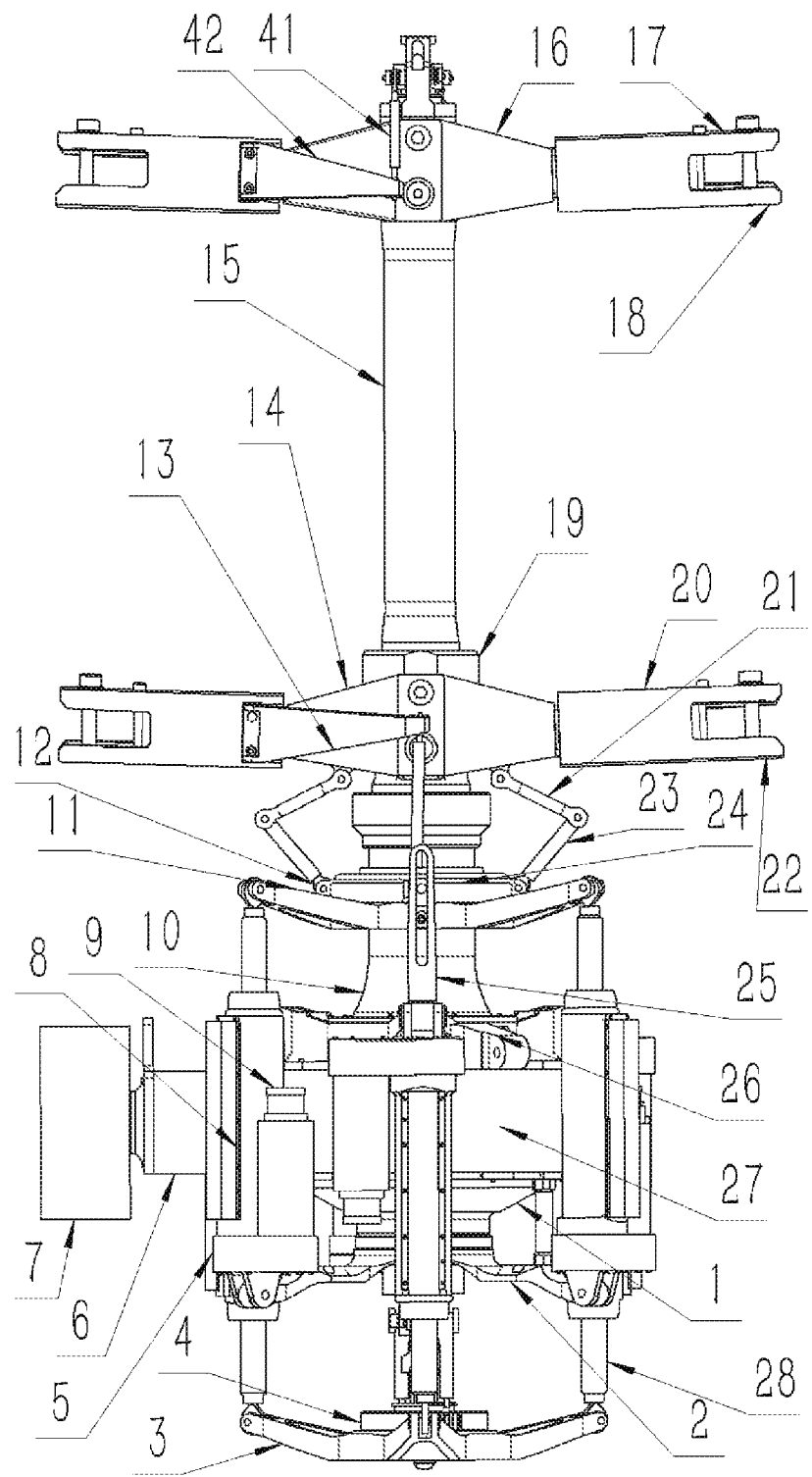
FIG. 6 is a right view of a rotor driving system in a twin-rotor coaxial autonomous helicopter to which a method for driving a rotor provided by an embodiment of the present invention is applicable.
Figure 7:
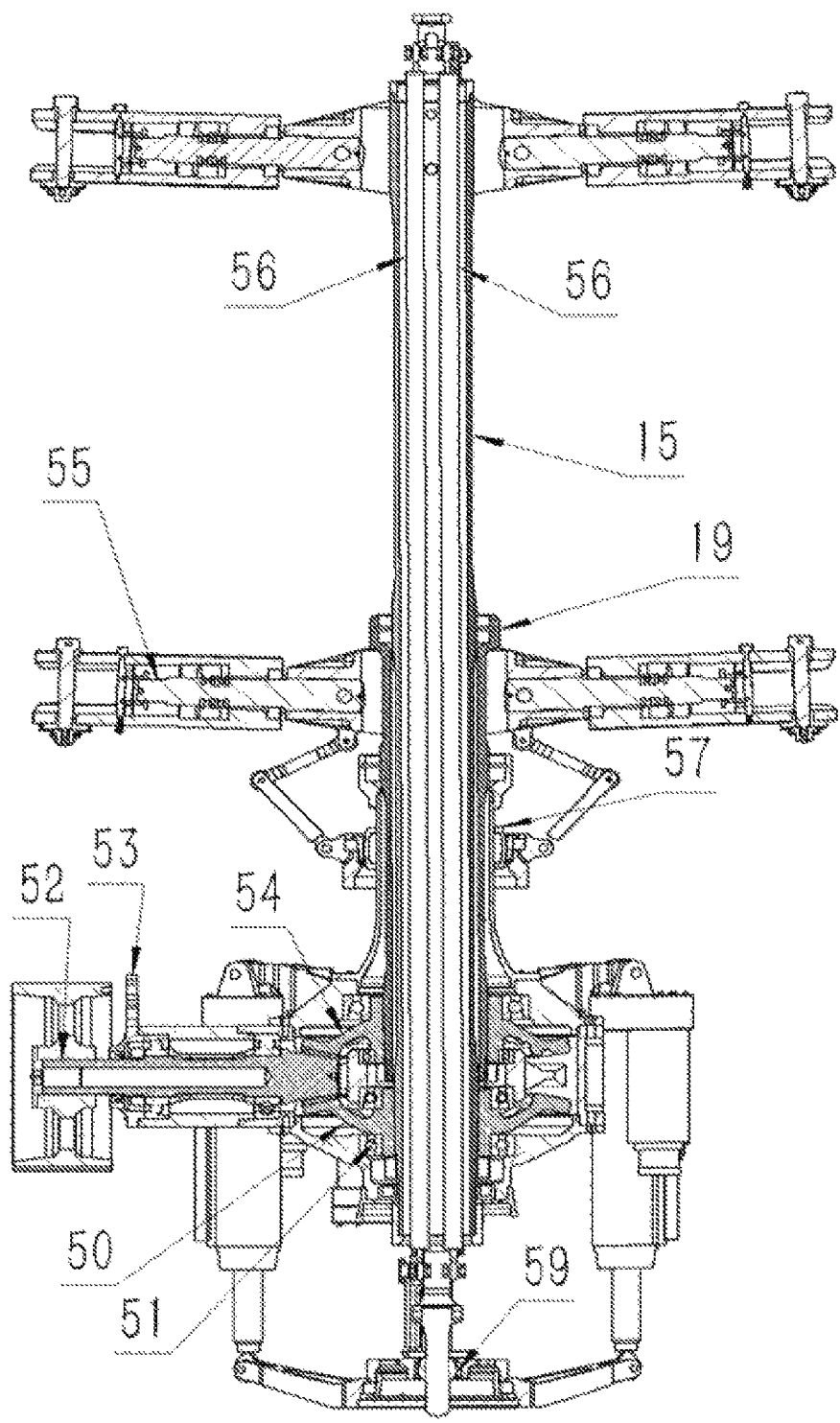
FIG. 7 is a full section view of the front view of a rotor driving system in a twin-rotor coaxial autonomous helicopter to which a method for driving a rotor provided by an embodiment of the present invention is applicable.

In order to describe clearly, a twin-rotor coaxial autonomous helicopter to which the method for driving a rotor provided by the embodiments of the present invention is applicable will be firstly introduced below with reference to FIGS. 1-7. FIG. 1 is a front view of the rotor driving system in this twin-rotor coaxial autonomous helicopter; FIG. 2 is a top view of the rotor driving system in this twin-rotor coaxial autonomous helicopter; FIG. 3 is a left view of the rotor driving system in this twin-rotor coaxial autonomous helicopter; FIG. 4 is a back view of the rotor driving system in this twin-rotor coaxial autonomous helicopter; FIG. 5 is a top view of the rotor driving system in this twin-rotor coaxial autonomous helicopter; FIG. 6 is a right view of the rotor driving system in this twin-rotor coaxial autonomous helicopter; and FIG. 7 is a full section view of the front view of the rotor driving system in this twin-rotor coaxial autonomous helicopter, wherein its section plane is a plane through the center line of an inner shaft and perpendicular to the paper surface and projects to the left.

As shown in FIGS. 1-7, this twin-rotor coaxial autonomous helicopter may include:

an outer shaft 19;

a lower rotor hub 14 fixed at outside of one end of the outer shaft 19;

at least two first blade clamping bodies connected with the lower rotor hub 14, wherein each of the first blade clamping bodies can be twisted relative to the lower rotor hub 14 and include a first blade clamp 20 and a second blade clamp 22, and wherein the first blade clamp 20 and the second blade clamp 22 cooperatively clamp the lower rotor blade;

an inner shaft 15;

an upper rotor hub 16 fixed at outside of one end of the inner shaft 15;

at least two second blade clamping bodies connected with the upper rotor hub 16, wherein each of the second blade clamping bodies can be twisted relative to the upper rotor hub 16 and include a third blade clamp 17 and a forth blade clamp 18, and wherein the third blade clamp 17 and the forth blade clamp 18 cooperatively clamp the upper rotor blade;

a box that may include an upper cover 26, a box body 27 and a lower cover 1, wherein a gear train is housed therein and is connected with the outer shaft 19 and the inner shaft 15;

a synchronous belt wheel 7 connected with the gear train, and the rotation of the synchronous belt wheel 7 drives the gear train to rotate so as to drive the outer shaft 19 and the inner shaft 15 to rotate, wherein the inner shaft 15 rotates reversely relative to the outer shaft 19, the lower rotor hub 14 is stationary relative to the outer shaft 19 and the upper rotor hub 16 is stationary relative to the inner shaft 15;

a rotor driving system that may include an lower-rotor driving system and a upper-rotor driving system;

wherein, the lower-rotor driving system may include:

at least two blade-clamp tilted arms 13 of the lower rotor, one end of each of which is fixed on a preset mounting surface of the corresponding first blade clamping body; wherein, each of the blade-clamp tilted arms 13 of the lower rotor uniquely corresponds to one first blade clamping body;

at least two lower tilted-arm pull rods 35, one end of each of which is connected with the other end of the corresponding blade-clamp tilted arm 13 of the lower rotor; wherein, each of the lower tilted-arm pull rods 35 uniquely corresponds to one blade-clamp tilted arm 13 of the lower rotor;

a supporting tower 10, which is sleeved on the outer shaft 19, with one end fixed on the upper cover 26; wherein, the inner wall of the supporting tower 10 is spaced from the outer wall of the outer shaft 19 by a certain distance such that the supporting tower 10 does not interfere the rotation of the outer shaft 19;

a rotating lower-rotor swashplate 24 which is sleeved on a nonrotating lower-rotor swashplate 11 and connected with the other end of each of the lower tilted-arm pull rods 35; wherein, the rotating lower-rotor swashplate 24 can rotate relative to the supporting tower 10;

at least two lower-rotor steering assemblies, one end of each of which is connected with the lower rotor hub 14 and the other end is connected with the rotating lower-rotor swashplate 24 so as to drive the rotating lower-rotor swashplate 24 to rotate as the lower rotor hub 14 rotates with the outer shaft 19;

a nonrotating lower-rotor swashplate 11 which is sleeved on the supporting tower 10 a lower-rotor joint bearing 57 and connected with the rotating lower-rotor swashplate 24 by the lower-rotor joint bearing 57, and the rotating lower-rotor swashplate 24 and the nonrotating lower-rotor swashplate 11 can rotate independently from each other; wherein, the nonrotating lower-rotor swashplate 11 can rotate relative to the supporting tower 10;

a actuator mounting base 2 which is fixedly connected with the lower cover 1 by a connection;

at least three first actuators 8 mounted on the actuator mounting base 2, wherein each of the first actuators 8 may include a housing and a first screw-rod outer sleeve rods 65, which can be telescoped upward and downward, with one end in the housing, and the end of each first screw-rod outer sleeve rod 65 that protrudes out of the housing is connected with the nonrotating lower-rotor swashplate 11 so as to drive the nonrotating lower-rotor swashplate 11 and thus the rotating lower-rotor swashplate 24 to tilt towards a specific direction as the first screw-rod outer sleeve rod 65 is telescoped upward and downward; wherein, the nonrotating lower-rotor swashplate 11 can tilt towards a specific direction when the extending lengths of the at least three first screw-rod outer sleeve rods 65 are different;

at least three first motors 9, each of which is connected with the corresponding first actuator 8 and controls it to telescope upward and downward;

a first anti-rotation rod 25, one end of which is fixed on a location other than the location of the upper cover 26 where the supporting tower 10 is located on and the other end is provided with a through hole;

a first sliding block 44 which is arranged on the nonrotating lower-rotor swashplate 11 and penetrates into the through hole of the first anti-rotation rod 25 so as to ensure that the nonrotating lower-rotor swashplate 11 can tilt towards a specific direction but is not rotatable with the rotating lower-rotor swashplate 24;

wherein, the upper-rotor driving system may include:

at least two blade-clamp tilted arms 42 of the upper rotor, one end of each of which is fixed on a preset mounting surface of the corresponding second blade clamping body; wherein, each of the blade-clamp tilted arms 42 of the upper rotor uniquely corresponds to one second blade clamping body;

at least two upper tilted-arm pull rods 41, one end of each of which is connected with the other end of the corresponding blade-clamp tilted arm 42 of the upper rotor; wherein, each of the upper tilted-arm pull rods 41 uniquely corresponds to one blade-clamp tilted arm 42 of the upper rotor;

at least two upper upper-rotor steering rods 40, one end of each of which is connected with the other end of the corresponding upper tilted-arm pull rod 41; wherein, each of the upper upper-rotor steering rods 40 uniquely corresponds to one upper tilted-arm pull rod 41;

an upper pull-rod plug 39 that is connected with the other end of each of the upper upper-rotor steering rods 40;

at least two pull rods 56 that are located within the inner shaft 15, one end of each of which is connected with the corresponding upper upper-rotor steering rod 40 by the upper pull-rod plug 39; wherein, each of the pull rods 56 uniquely corresponds to one upper upper-rotor steering rod 40;

a lower pull-rod plug 64;

at least two lower upper-rotor steering rods 45, one end of each of which is connected with the lower pull-rod plug 64, and connected with the other end of the corresponding pull rod 56 by the lower pull-rod plug 64; wherein, each of the lower upper-rotor steering rods 45 uniquely corresponds to one pull rod 56;

at least two upper-rotor steering rod—L arms 47, one end of each of which is connected with the other end of the corresponding lower upper-rotor steering rod 45; wherein, each of the upper-rotor steering rod—L arms 47 uniquely corresponds to one lower upper-rotor steering rod 45;

a sliding rod 46 of an upper-rotor swash plate;

a rotating upper-rotor swashplate 4 that is sleeved on the sliding rod 46 of the upper-rotor swash plate by an upper-rotor joint bearing 59 and is connected with the other end of the upper-rotor steering rod—L arm 47 such that the rotating upper-rotor swashplate 4 is driven to rotate under action of the upper-rotor steering rod—L arms 47 and the lower upper-rotor steering rods 45 when the upper rotor hub 16 rotates with the inner shaft 15; wherein, the rotating upper-rotor swashplate 4 can rotate relative to the sliding rod 46 of the upper-rotor swash plate;

a nonrotating upper-rotor swashplate 3 that is sleeved on the rotating upper-rotor swashplate 4, and the rotating upper-rotor swashplate 4 and the nonrotating upper-rotor swashplate 3 can rotate independently from each other; wherein, the nonrotating upper-rotor swashplate 3 can rotate relative to the sliding rod 46 of the upper-rotor swash plate;

at least three second actuators 58 that are mounted on the upper cover 26, each of the second actuators 58 may include a housing and a second screw-rod outer sleeve rod 28, which can be telescoped upward and downward, with one end in the housing, the end of each second screw-rod outer sleeve rod 28 that protrudes out of the housing is connected with the nonrotating upper-rotor swashplate 3 so as to drive the nonrotating upper-rotor swashplate 3 and thus the rotating upper-rotor swashplate 4 to tilt towards a specific direction as the second screw-rod outer sleeve rod 28 is telescoped upward and downward; wherein, the nonrotating upper-rotor swashplate 3 can tilt towards a specific direction when the extending lengths of the at least three second screw-rod outer sleeve rods 28 are different;

at least three second motors 49, each of which is connected with a second screw-rod outer sleeve rod 28 of the corresponding second actuator 58 and controls it to telescope upward and downward;

a second anti-rotation rod 29 with one end fixed on the actuator mounting base 2 and the other end is provided with a through hole;

a second sliding block 30 that is arranged on the nonrotating upper-rotor swashplate 3 and penetrates into the through hole of the second anti-rotation rod 29 such that the nonrotating upper-rotor swashplate 3 can tilt towards a specific direction but is not rotatable with the rotating upper-rotor swashplate 4.

Here, under action of a blade-clamp shaft, each of the first blade clamping bodies can be twisted relative to the lower rotor hub 14 and each of the second blade clamping bodies can be twisted relative to the upper rotor hub 16, for example, as shown in FIG. 7, a blade-clamp shaft 55 is provided within the second blade clamping body, enabling the second clamping body to twist relative to the upper rotor hub 16.

Further, in particular, an extension end 6 of the box body 27 is connected with the synchronous belt wheel 7 such that the synchronous belt wheel 7 can rotate smoothly under action of an engine as a power device in the twin-rotor coaxial autonomous helicopter without being affected by other elements. Moreover, the gear train housed in the box may include a bevel-gear shaft 52, an upper bevel gear 54 and a lower bevel gear 50; wherein, the synchronous belt wheel 7 is connected with the bevel-gear shaft 52 which in turn is respectively connected to the upper bevel gear 54 and the lower bevel gear 50; and the upper bevel gear 54 is connected with the outer shaft 19 and the lower bevel gear 50 is connected with the inner shaft 15. Further, a gear-shaft end cover 53 may be included, which is arranged on the extension end 6 of the box body 27, for positioning the axial direction of the bevel-gear shaft 52.

It should be noted that the lower-rotor steering assembly can be constituted by two elements, for example, the lower-rotor steering assembly can be constituted by a anti-rotation plate 21 and a lower-rotor steering rod—L arm 23 as shown in FIGS. 3 and 6, wherein one end of the anti-rotation plate 21 is connected with one end of the lower-rotor steering rod—L arm 23 and the other end of the anti-rotation plate 21 is connected with the lower rotor hub 14, and the other end of the lower-rotor steering rod—L arm 23 is connected with the rotating lower-rotor swashplate 24. Of course, it can be understood by those skilled in the art that the lower-rotor steering assembly can also be constituted by one element, wherein one end of this element is connected with the lower rotor hub 14 and the other end is connected with the rotating lower-rotor swashplate 24; alternatively, it is also possible that the lower-rotor steering assembly can be constituted by at least three elements, by which the lower rotor hub 14 and the rotating lower-rotor swashplate 24 are connected with each other.

Here, for the length of the through hole of the first anti-rotation rod 25, it is necessary to ensure that the nonrotating lower-rotor swashplate 11 can tilt towards a specific direction smoothly; for the length of the through hole of the second anti-rotation rod 29, it is necessary to ensure that the nonrotating upper-rotor swashplate 3 can tilt towards a specific direction smoothly.

Here, the lengths of the first sliding block 44 and the second sliding block 30 can be set according to the actual situations. For example, the first sliding block 44 may penetrate into the through hole of the first anti-rotation rod 25 but do not penetrate out of the through hole; alternatively, it is also possible that the first sliding block 44 may penetrate into and out of the through hole of the first anti-rotation rod 25; and the second sliding block 30 can penetrate into the through hole of the second anti-rotation rod 29 but do not penetrate out of the through hole; alternatively, it is also possible that the second sliding block 30 can penetrate into and out of the through hole of the second anti-rotation rod 29.

Also, the connections between the elements described in the embodiments of the present invention can utilize, but is not limited to, a bearing connection or a threaded connection according to the actual application requirements. For example, the connection between the nonrotating lower-rotor swashplate 11 and the rotating lower-rotor swashplate 24 and the connection between the nonrotating upper-rotor swashplate 3 and the rotating upper-rotor swashplate 4 can both utilize a bearing connection; the lower-rotor steering assembly can be connected with a bearing seat 12 of L-arm rod end that is connected to the rotating lower-rotor swashplate 24 and thus enabling the connection with the rotating lower-rotor swashplate 24; the lower upper-rotor steering rod 45 can be connected with the lower pull-rod plug 64 via a lower pull-rod joint bearing 32; the upper tilted-arm pull rod 41 can be connected to a bearing seat 36 of tilted-arm upper rod end that is connected to a blade-clamp tilted arm 42 of the upper rotor, thus enabling the connection with the blade-clamp tilted arm 42 of the upper rotor; the upper pull-rod plug 39 can be connected to a bearing seat 38 of an pull rod upper joint that is connected to the upper upper-rotor steering rod 40, thus enabling the connection with the upper upper-rotor steering rod 40; the first screw-rod outer sleeve rod 65 can be connected with a nonrotating lower-rotor swashplate 11 by a rod-end bearing seat 33; the lower tilted-arm pull rod 35 can be connected with a rotating lower-rotor swashplate 24 by a bearing seat 34 of tilted-arm lower rod-end; similarly, a lower joint bearing 48, the lower-rotor joint bearing 57, the upper-rotor joint bearing 59 and a bearing 51 also may serve as the connection parts between corresponding elements.

It should be noted that the rotor driving system provided by the embodiments of the present invention can be connected to the frame of a twin-rotor coaxial autonomous helicopter by a first connection point 60, a second connection point 61, a third connection point 62 and a fourth connection point 63.

Further, in order to achieve a stable structure, the upper-rotor driving system may include:

an upper inner-shaft head frame 37, which is connected with each of the upper upper-rotor steering rods 40 to support each of the upper upper-rotor steering rods 40 without affecting the rotation thereof, one end of the upper inner-shaft head frame 37 is fixed to the end of inner shaft 15 on which the upper rotor hub 16 is mounted;

a lower inner-shaft head frame 31, which is connected with each of the lower upper-rotor steering rods 45 to support each of the lower upper-rotor steering rods 45 without affecting the rotation thereof, one end of the lower inner-shaft head frame 31 is fixed on the inner shaft 15, and the other end is connected with the end of a sliding rod 46 of the lower-rotor tilted plate on which the rotating upper-rotor swashplate 4 is mounted.

It can be seen that shake caused when the upper upper-rotor steering rods 40 and the upper tilted-arm pull rods 41 rotate with the inner shaft 15 can be avoided by adding the upper inner-shaft head frame 37, and thus improving the structural stability; and the shake caused when the lower upper-rotor steering rods 45 rotate with the inner shaft 15 can be avoided by adding the lower inner-shaft head frame 31, and thus improving the structural stability.

Further, the lower-rotor driving system may further include:

at least three first gearbox bodies 5, each of which is connected with a corresponding first motor 9, wherein, the rotational speed output by the corresponding first motor 9 is adjusted by each of the first gearbox bodies 5.

Correspondingly, the upper-rotor driving system may further include:

at least three second gearbox bodies 43, each of which is connected with a corresponding second motor 49, wherein, the rotational speed output by the corresponding second motor 49 is adjusted by each of the second gearbox bodies 43.

It can be understood by those skilled in the art that the first gearbox body 5 and the second gearbox body 43 may be, but not be limited to, a gear type gearbox body or a chain type gearbox body.

It can be seen that the selectivity of the first motor 9 is improved by providing a first gearbox body 5 for the first motor 9; and the selectivity of the second motor 49 is improved by providing a second gearbox body 43 for the second motor 49.

Further, the width of one end of the blade-clamp tilted arm 13 of the lower rotor that is fixed on the first blade clamping body may be greater than the width of the other end of the blade-clamp tilted arm 13 of the lower rotor; the width of one end of the blade-clamp tilted arm 42 of the upper rotor that is fixed on the second blade clamping body may be greater than the width of the other end the blade-clamp tilted arm 42 of the upper rotor, wherein, the difference in widths is intended to make the blade-clamp tilted arms 13 of the lower rotor and the blade-clamp tilted arms 42 of the upper rotor to achieve the same strength so as to reduce the mass of the blade-clamp tilted arms 13 of the lower rotor and the blade-clamp tilted arms 42 of the upper rotor.

Figure 8:
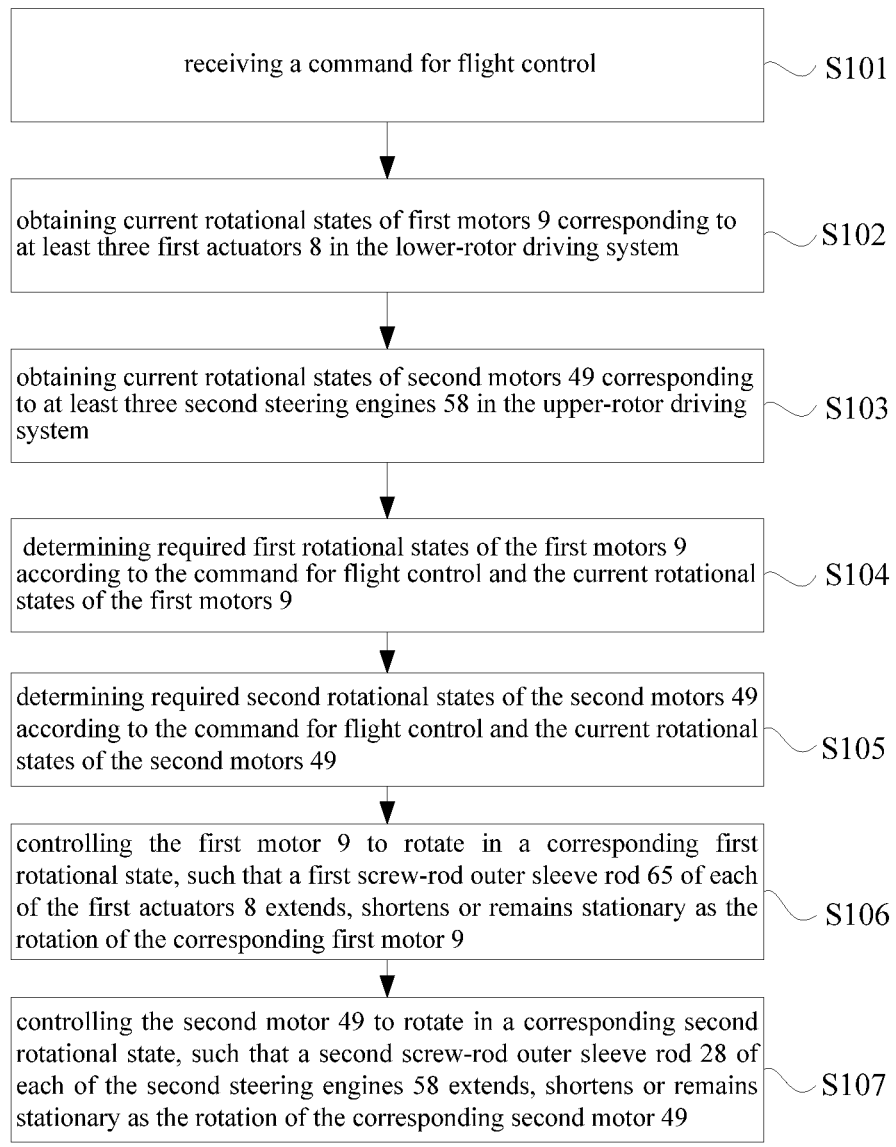
FIG. 8 is a first flowchart of a method for driving a rotor provided by an embodiment of the present invention.

Based on the twin-rotor coaxial autonomous helicopter described above, as shown in FIG. 8, a method for driving a rotor provided by embodiments of the present invention may include the following steps.

S101: a command for flight control is received, wherein, a command for flight control can be sent by an operator through an operation interface when it is needed to drive a rotor system, a flight control device on the frame of a coaxial autonomous helicopter will receive the command for flight control and perform the subsequent processes according to the received command for flight control.

It can be understood by those skilled in the art that the command for flight control can be a takeoff command, a hover command, a forward command, a reverse command, a left steering command or a right steering command. It is possible that the command for flight control can be sent by a remote controller, alternatively the command for flight control can be sent by a ground control station.

S102: current rotational states of first motors 9 corresponding to at least three first actuators 8 in the lower-rotor driving system are obtained;

S103: current rotational states of second motors 49 corresponding to at least three second actuators 58 in the upper-rotor driving system are obtained;

After receiving a command for flight control, the flight control device can obtain the current rotational states of first motors 9 corresponding to at least three first actuators 8 in the lower-rotor driving system and the current rotational states of second motors 49 corresponding to at least three second actuators 58 in the upper-rotor driving system, and thus subsequent processes can be carried out. Further, each of the first actuators 8 uniquely corresponds to one first motor 9, each of the second actuators 58 uniquely corresponds to one second motor 59, and each of the first motors 9 uniquely corresponds to one current rotational state, each of the second motors 49 uniquely corresponds to one current rotational state. The current rotational states of various first motors 9 can be the same or different and the current rotational states of various second motors 49 can be the same or different.

It can be understood by those skilled in the art that the rotational state of a motor can be the angle by which the motor rotates.

S104: the required first rotational states of the first motors 9 are determined according to the command for flight control and the current rotational states of the first motors 9;

the required first rotational states of the first motors 9 can be determined after obtaining the command for flight control and the current rotational states of the first motors 9, and the first motors 9 are subsequently controlled according to the first rotational states. wherein, each of the first motors 9 uniquely corresponds to one first rotational state. The required first rotational states of various first motors 9 can be the same or different.

S105: the required second rotational states of the second motors 49 are determined according to the command for flight control and the current rotational states of the second motors 49;

the required second rotational states of the second motors 49 can be determined after obtaining the command for flight control and the current rotational states of the second motors 49, and the second motors 49 are subsequently controlled according to the second rotational states. Wherein, each of the second motors 49 uniquely corresponds to one second rotational state. The required second rotational states of various second motors 49 can be the same or different.

S106: the first motor 9 is controlled to rotate in a corresponding first rotational state such that a first screw-rod outer sleeve rod 65 of each of the first actuators 8 extends, shortens or remains stationary with the rotation of the corresponding first motor 9;

wherein, the first screw-rod outer sleeve rod 65 of each of the first actuators 8 extends, shortens or remains stationary with the rotation of the corresponding first motor 9, which can drive a nonrotating lower-rotor swashplate 11 in the lower-rotor driving system to tilt towards a specific direction and thus drive the rotating lower-rotor swashplate 24, the at least two lower tilted-arm pull rods 35 and the at least two blade-clamp tilted arms 13 of the lower rotor to move, thus enabling the first blade clamping bodies to be twisted relative to the lower rotor hub 14.

It should be noted that the first screw-rod outer sleeve rod 65 of the first motor 8 will remain stationary (i.e., neither extends nor shortens) with the rotation of the corresponding first motor 9 when the first rotational state of the first motor 9 and the current rotational state thereof are the same; and the first screw-rod outer sleeve rod 65 of the first motor 8 will extend or shorten with the rotation of the corresponding first motor 9 when the first rotational state of the first motor 9 and the current rotational state thereof are different;

S107: the second motor 49 is controlled to rotate in a corresponding second rotational state such that a second screw-rod outer sleeve rod 28 of each of the second actuators 58 extends, shortens or remains stationary with the rotation of the corresponding second motor 49.

Wherein, the second screw-rod outer sleeve rod 28 of each of the second actuators 58 extends, shortens or remains stationary with the rotation of the corresponding second motor 49 which can drive a nonrotating upper-rotor swashplate 3 in the upper-rotor driving system to tilt towards a specific direction and thus drive the rotating upper-rotor swashplate 4, the at least two upper-rotor steering rod—L arms 47, the at least two lower upper-rotor steering rods 45, the at least two pull rods 56 within the inner shaft 15, the at least two upper upper-rotor steering rods 40, the at least two upper tilted-arm pull rods 41 and at least two blade-clamp tilted arms 42 of the upper rotor to move, thus enabling the second blade clamping bodies to be twisted relative to the upper rotor hub 16.

It should be noted that the second screw-rod outer sleeve rod 28 of the second motor 58 will remain stationary (i.e., neither extends nor shortens) with the rotation of the corresponding second actuator 58 when the second rotational state of the second motor 58 and the current rotational state thereof are the same; and the second screw-rod outer sleeve rod 28 of the second motor 58 will extend or shorten with the rotation of the corresponding second actuator 58 when the second rotational state of the second motor 58 and the current rotational state thereof are different.

Wherein, the rotation of the lower rotor hub 14 with the outer shaft 19 drives the rotating lower-rotor swashplate 24 to rotate under action of the at least two lower-rotor steering assemblies in the lower-rotor driving system; the rotation of the upper rotor hub 16 with the inner shaft 15 drives the rotating upper-rotor swashplate 4 to rotate under action of the upper-rotor steering rod—L arms 47 and the lower upper-rotor steering rods 45.

The nonrotating lower-rotor swashplate 11 is not rotatable with the rotating lower-rotor swashplate 24 under action of the first anti-rotation rod 25 and the first sliding block 44 in the lower rotor driving system; the nonrotating upper-rotor swashplate 3 is not rotatable with the rotating upper-rotor swashplate 4 under action of the second anti-rotation rod 29 and the second sliding block 30 in the upper-rotor driving system.

In an embodiment of the present invention, a method for driving a rotor may comprise: receiving a command for flight control; obtaining current rotational states of first motors 9 corresponding to at least three first actuators 8 and current rotational states of second motors 49 corresponding to at least three second actuators 58; determining required first rotational states of the first motors 9 according to the command for flight control and the current rotational states of the first motors 9; determining required second rotational states of the second motors 49 according to the command for flight control and the current rotational states of the second motors 49; controlling the first motor 9 to rotate in a corresponding first rotational state, such that a first screw-rod outer sleeve rod 65 of each of the first actuators 8 extends, shortens or remains stationary with the rotation of the corresponding first motor 9 so as to drive a nonrotating lower-rotor swashplate 11 to tilt toward a specific direction and thus a rotating lower-rotor swashplate 24, at least two lower tilted-arm pull rods 35 and at least two blade-clamp tilted arms 13 of the lower rotor to move, thus enabling the first blade clamping bodies to be twisted relative to the lower rotor hub 14; controlling the second motor 49 to rotate in a corresponding second rotational state, such that a second screw-rod outer sleeve rod 28 of each of the second actuators 58 extends, shortens or remains stationary with the rotation of the corresponding second motor 49 so as to drive a nonrotating upper-rotor swashplate 3 to tilt towards a specific direction and thus drive a rotating upper-rotor swashplate 4, at least two upper-rotor steering rod—L arms 47, at least two lower upper-rotor steering rods 45, at least two pull rods 56 within the inner shaft 15, at least two upper upper-rotor steering rods 40, at least two upper tilted-arm pull rods 41 and at least two blade-clamp tilted arms 42 of the upper rotor to move, thus enabling the second blade clamping bodies to be twisted relative to the upper rotor hub 16. As such, with the method for driving a rotor provided by the embodiments of the present invention, the various components that are located between the screw-rod outer sleeve rod and the blade clamping body can operate jointly by controlling the rotary angle of the rotors to control the extending and shortening of the screw-rod outer sleeve rod in the actuator to which the rotor is connected, such that various elements between the screw-rod outer sleeve rod and a blade clamping body can be linked to drive the blade clamping body to twist relative to the hub, thus reducing the complexity of the rotor driving process and overcoming the drawback of complex driving process present in existing rotor driving methods of existing rotor driving systems.

Figure 9:
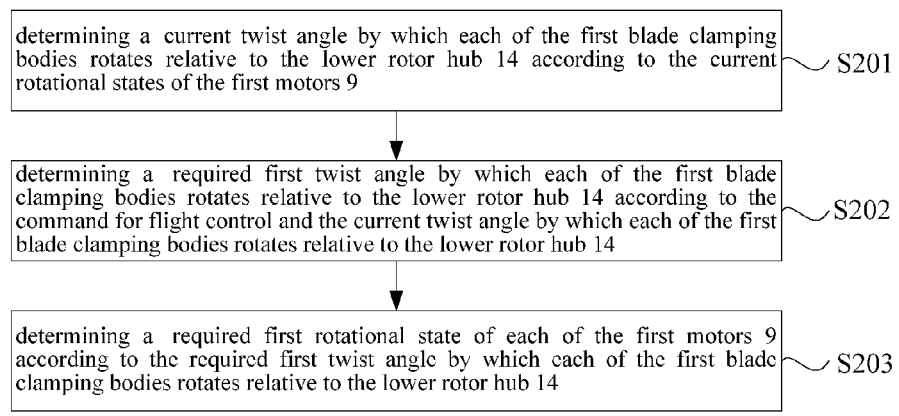
FIG. 9 is a second flowchart of a method for driving a rotor provided by an embodiment of the present invention.

In particular, as shown in FIG. 9, the step of determining required first rotational states of the first motors 9 according to the command for flight control and the current rotational states of the first motors 9 may comprise:

S201: the current twist angle by which each of the first blade clamping bodies rotates relative to the lower rotor hub 14 is determined according to the current rotational states of the first motors 9;

wherein, each of the first blade clamping bodies uniquely corresponds to one current twist angle.

It can be understood by those skilled in the art that it is possible to determine the current twist angle by which each of the first blade clamping bodies rotates relative to the lower rotor hub 14 according to a pre-built corresponding relationship between twist angle by which each of the first blade clamping bodies rotates relative to the lower rotor hub 14 and the rotational states of the first motors 9 after determining current rotational states of the first motors 9. Wherein, the corresponding relationship between the twist angle by which each of the first blade clamping bodies rotates relative to the lower rotor hub 14 and the rotational states of the first motors 9 can be obtained by calculation.

Wherein, the current twist angles by which the various first blade clamping bodies rotate relative to the lower rotor hub 14 can be the same or different.

S202: the required first twist angle by which each of the first blade clamping bodies rotates relative to the lower rotor hub 14 is determined according to the command for flight control and the current twist angle by which each of the first blade clamping bodies rotates relative to the lower rotor hub 14;

wherein, each of the first blade clamping bodies uniquely corresponds to the first current twist angle. It is possible to obtain the required first twist angle by which each of the first blade clamping bodies rotates relative to the lower rotor hub 14 by the combination of the obtained command for flight control and the obtained current twist angle by which each of the first blade clamping bodies rotates relative to the lower rotor hub 14, and then to carry out the subsequent processes.

Wherein, the first twist angles by which various first blade clamping bodies rotate relative to the lower rotor hub 14 can be the same or different.

S203: the required first rotational state of each of the first motors 9 is determined according to the required first twist angle by which each of the first blade clamping bodies rotates relative to the lower rotor hub 14.

The required first rotational state of each of the first motors 9 can be determined according to a pre-built corresponding relationship between the twist angle by which each of the first blade clamping bodies rotates relative to the lower rotor hub 14 and the rotational states of the first motors 9 after determining the required first twist angle by which each of the first blade clamping bodies rotates relative to the lower rotor hub 14. Wherein, the required first rotational states of various first motors 9 can be the same or different.

Figure 10:
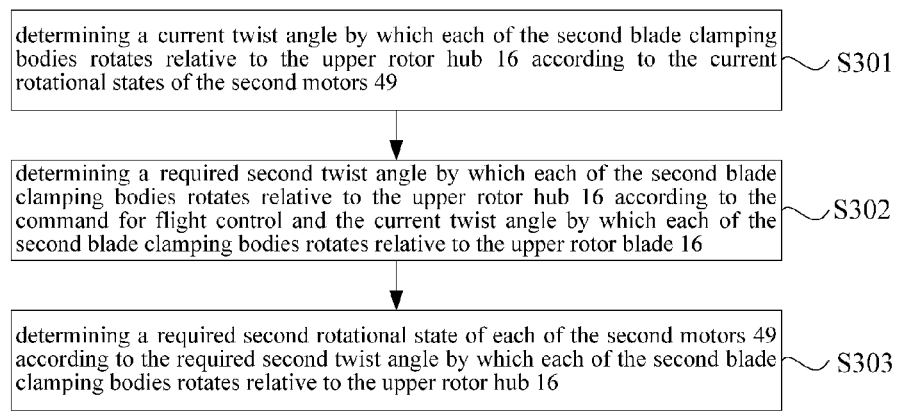
FIG. 10 is a third flowchart of a method for driving a rotor provided by an embodiment of the present invention.

Correspondingly as shown in FIG. 10, the step of determining required second rotational states of the second motors 49 according to the command for flight control and the current rotational states of the second motors 10 may comprise:

S301: the current twist angle by which each of the second blade clamping bodies rotates relative to the upper rotor hub 16 is determined according to the current rotational states of the second motors 49;

wherein, each of the second blade clamping bodies uniquely corresponds to one current twist angle.

It can be understood by those skilled in the art that it is possible to determine the current twist angle by which each of the second blade clamping bodies rotates relative to the upper rotor hub 16 according to a pre-built corresponding relationship between the twist angle by which each of the second blade clamping bodies rotates relative to the upper rotor hub 16 and the rotational states of the second motors 49 after determining current rotational states of the second motors 49. Wherein, the corresponding relationship between the twist angle by which each of the second blade clamping bodies rotates relative to the upper rotor hub 16 and the rotational states of the second motors 49 can be obtained by calculation.

Wherein, the current twist angles by which the various second blade clamping bodies rotate relative to the lower rotor hub 16 can be the same or different.

S302: the required second twist angle by which each of the second blade clamping bodies rotate relative to the upper rotor hub 16 is determined according to the command for flight control and the required current twist angle by which each of the second blade clamping bodies rotates relative to the upper rotor blade 16;

wherein, each of the second blade clamping bodies uniquely corresponds to the second twist angle.

It is possible to obtain the required second twist angle by which each of the second blade clamping bodies rotates relative to the upper rotor hub 16 by the combination of the obtained command for flight control and the obtained current twist angle by which each of the second blade clamping bodies rotates relative to the upper rotor blade 16, and then to carry out the subsequent processes.

Wherein, the second twist angles by which various second blade clamping bodies rotate relative to the lower rotor hub 16 can be the same or different.

S303: the required second rotational state of each of the second motors 49 is determined according to the required second twist angle by which each of the second blade clamping bodies rotates relative to the upper rotor hub 16.

The required second rotational state of each of the second motors 49 can be determined according to the pre-established corresponding relationship between the twist angle by which each of the second blade clamping bodies rotates relative to the upper rotor hub 16 and the rotational states of the second motors 49 after the required second twist angle by which each of the second blade clamping bodies rotates relative to the upper rotor hub 16. Wherein, the second rotational states of various second motors 49 can be the same or different.

It should be noted that the above-described method of determining required first rotational states of first motors 9 according to the command for flight control and the current rotational states of the first motors 9 is only for illustration, and should not be interpreted to limit the embodiments of the present invention; similarly, the above-described method of determining required second rotational states of second motors 49 according to the command for flight control and the current rotational states of the second motors 49 is only for illustration, and should not be interpreted to limit the embodiments of the present invention.

Corresponding to the method embodiments, an embodiment of the present invention also provides a rotor driving device that is applicable to a twin-rotor coaxial autonomous helicopter, which may comprise:

an outer shaft 19;

a lower rotor hub 14 fixed at outside of one end of the outer shaft 19;

at least two first blade clamping bodies that are connected with the lower rotor hub 14, each of the first blade clamping bodies can be twisted relative to the lower rotor hub 14 and comprises a first blade clamp 20 and a second blade clamp 22, wherein, the first blade clamp 20 and the second blade clamp 22 cooperatively clamp the lower rotor blade;

an inner shaft 15;

an upper rotor hub 16 fixed at outside of one end of the inner shaft 15;

at least two second blade clamping bodies that are connected with the upper rotor hub 16, each of the second blade clamping bodies can be twisted relative to the upper rotor hub 16 and comprises a third blade clamp 17 and a forth blade clamp 18, wherein, the third blade clamp 17 and the forth blade clamp 18 cooperatively clamp the upper rotor blade;

a box, in which a gear train is housed, comprising an upper cover 26, a box body 27 and a lower cover 1, wherein, the gear train is connected with the outer shaft 19 and the inner shaft 15;

a synchronous belt wheel 7 that is connected with the gear train, and the rotation of the synchronous belt wheel drives the gear train to rotate so as to drive the outer shaft 19 and the inner shaft 15 to rotate, and wherein the outer shaft 19 rotates reversely relative to the inner shaft 15, the lower rotor hub 14 is stationary relative to the outer shaft 19 and the upper rotor hub 16 is stationary relative to the inner shaft 15;

a rotor driving system constituted by an upper-rotor driving system and a lower-rotor driving system.

Figure 11:
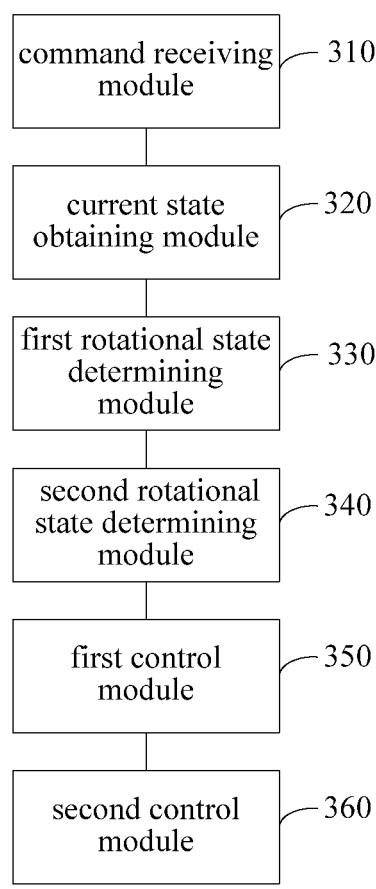
FIG. 11 is a structural schematic view of a rotor driving device provided by an embodiment of the present invention.

As shown in FIG. 11, the rotor driving device may comprise:

a command receiving module 310 for receiving a command for flight control;

a current state obtaining module 320 for obtaining current rotational states of first motors 9 corresponding to at least three first actuators 8 in the lower-rotor driving system and current rotational states of second motors 49 corresponding to at least three second actuators 58 in the upper-rotor driving system; wherein, each of the first actuators 8 uniquely corresponds to one first motor 9, each of the second actuators 58 uniquely corresponds to one second motor 59, and each of the first motors 9 uniquely corresponds to one current rotational state, each of the second motors 49 uniquely corresponds to one current rotational state;

a first rotational state determining module 330 for determining required first rotational states of the first motors 9 according to the command for flight control and the current rotational states of the first motors 9; wherein, each of the first motors 9 uniquely corresponds to one first rotational state;

a second rotational state determining module 340 for determining required second rotational states of the second motors 49 according to the command for flight control and the current rotational states of the second motors 49; wherein, each of the second motors 49 uniquely corresponds to one second rotational state;

a first control module 350 for controlling the first motor 9 to rotate in a corresponding first rotational state, such that a first screw-rod outer sleeve rod 65 of each of the first actuators 8 extends, shortens or remains stationary with the rotation of the corresponding first motor 9 so as to drive a nonrotating lower-rotor swashplate 11 in the lower-rotor driving system to tilt towards a specific direction and thus drive a rotating lower-rotor swashplate 24, at least two lower tilted-arm pull rods 35 and at least two blade-clamp tilted arms 13 of the lower rotor to move, enabling twisting of the first blade clamping bodies relative to the lower rotor hub 14; wherein, each of the first actuators 8 comprises a housing; and a first screw-rod outer sleeve rod 65, which can be telescoped upward and downward, with one end located in the housing, the end of each of the first screw-rod outer sleeve rods 65 that protrudes out of the housing is connected with the nonrotating lower-rotor swashplate 11; the rotating lower-rotor swashplate 24 is sleeved on the nonrotating lower-rotor swashplate 11, and the nonrotating lower-rotor swashplate 11 is connected with the rotating lower-rotor swashplate 24 via a lower-rotor joint bearing 57, and the rotating lower-rotor swashplate 24 and the nonrotating lower-rotor swashplate 11 can rotate independently from each other; one end of each of the blade-clamp tilted arms 13 of the lower rotor is fixed on a preset mounting surface of the corresponding first blade clamping body; one end of each of the lower tilted-arm pull rods 35 is connected with the other end of the corresponding blade-clamp tilted arm 13 of the lower rotor; the rotating lower-rotor swashplate 24 is connected with the other end of each of the lower tilted-arm pull rods 35;

a second control module 360 for controlling the second motor 49 to rotate in a corresponding second rotational state, such that a second screw-rod outer sleeve rod 28 of each of the second actuators 58 extends, shortens or remains stationary as rotation of the corresponding second motor 49 so as to drive a nonrotating upper-rotor swashplate 3 in the upper-rotor driving system to tilt towards a specific direction and thus drive a rotating upper-rotor swashplate 4, at least two upper-rotor steering rod—L arms 47, at least two lower upper-rotor steering rods 45, at least two pull rods 56 within the inner shaft 15, at least two upper upper-rotor steering rods 40, at least two upper tilted-arm pull rods 41, at least two blade-clamp tilted arms 42 of the upper rotor to move, enabling twisting of the second blade clamping bodies relative to the upper rotor hub 16; wherein, each of the second actuators 58 comprises a housing; and a second screw-rod outer sleeve rod 28, which can be telescoped upward and downward, with one end located in the housing, the end of each of the second screw-rod outer sleeve rods 28 that protrudes out of the housing is connected with the nonrotating upper-rotor swashplate 3; the nonrotating upper-rotor swashplate 3 is connected with the rotating upper-rotor swashplate 4 and the rotating upper-rotor swashplate 4 and the nonrotating upper-rotor swashplate 3 can rotate independently from each other; one end of each of the blade-clamp tilted arms 42 of the upper rotor is fixed on a preset mounting surface of the corresponding second blade clamping body; one end of each of the upper tilted-arm pull rods 41 is connected with the other end of the corresponding blade-clamp tilted arm 42 of the upper rotor; one end of each of the upper upper-rotor steering rods 40 is connected with the other end of the corresponding upper tilted-arm pull rod 41; an upper pull-rod plug 39 is connected with the other end of each of the upper upper-rotor steering rods 40 one end of each of the pull rods is connected with the corresponding upper upper-rotor steering rod 40 by the upper pull-rod plug 39; one end of the lower pull-rod plug 64 is connected with the other end of the pull rod 56; one end of each of the lower upper-rotor steering rods 45 is connected with the lower pull-rod plug 64, and is connected with the other end of the corresponding pull rod 56 by the lower pull-rod plug 64; one end of each of the upper-rotor steering rod—L arms 47 is connected with the other end of the corresponding lower upper-rotor steering rod 45; the rotating upper-rotor swashplate 4 is connected with the other end of the upper-rotor steering rod—L arms 47;

wherein, under action of at least two lower-rotor steering assemblies in the lower-rotor driving system, the rotation of the lower rotor hub 14 with the outer shaft 19 drives the rotating lower-rotor swashplate 24 to rotate; under action of the upper-rotor steering rod—L arms 47 and the lower upper-rotor steering rods 45, the rotation of the upper rotor hub 16 with the inner shaft 15 drives the rotating upper-rotor swashplate 4 to rotate; wherein, one end of each of the lower-rotor steering assemblies is fixed on the lower rotor hub 14 and the other end is fixed on the rotating lower-rotor swashplate 24;

the nonrotating lower-rotor swashplate 11 is not rotatable with the rotating lower-rotor swashplate 24 under action of a first anti-rotation rod 25 and a first sliding block 44 in the lower rotor driving system; the nonrotating upper-rotor swashplate 3 is not rotatable with the rotating upper-rotor swashplate 4 under action of a second anti-rotation rod 29 and a second sliding block 30 in the upper-rotor driving system; wherein, one end of the first anti-rotation rod 25 is fixed on the upper cover 26 and the other end is provided with a through hole, and the first sliding block 44 is arranged on the nonrotating lower-rotor swashplate 11 and penetrates into the through hole of the first anti-rotation rod 25; one end of the second anti-rotation rod 29 is fixed on a actuator mounting base 2 and the other end is provided with a through hole, and the second sliding block 30 is arranged on the nonrotating upper-rotor swashplate 3 and penetrates into the through hole of the second anti-rotation rod 29.

In an embodiment of the present invention, a method for driving a rotor may comprise: receiving a command for flight control; obtaining current rotational states of first motors 9 corresponding to at least three first actuators 8 and current rotational states of second motors 49 corresponding to at least three second actuators 58; determining required first rotational states of the first motors 9 according to the command for flight control and the current rotational states of the first motors 9; determining required second rotational states of the second motors 49 according to the command for flight control and the current rotational states of the second motors 49; controlling the first motor 9 to rotate in a corresponding first rotational state, such that a first screw-rod outer sleeve rod 65 of each of the first actuators 8 extends, shortens or remains stationary with the rotation of the corresponding first motor 9 so as to drive a nonrotating lower-rotor swashplate 11 to tilt toward a specific direction and thus a rotating lower-rotor swashplate 24, at least two lower tilted-arm pull rods 35 and at least two blade-clamp tilted arms 13 of the lower rotor to move, thus enabling the first blade clamping bodies to be twisted relative to the lower rotor hub 14; controlling the second motor 49 to rotate in a corresponding second rotational state, such that a second screw-rod outer sleeve rod 28 of each of the second actuators 58 extends, shortens or remains stationary with the rotation of the corresponding second motor 49 so as to drive a nonrotating upper-rotor swashplate 3 to tilt towards a specific direction and thus drive a rotating upper-rotor swashplate 4, at least two upper-rotor steering rod—L arms 47, at least two lower upper-rotor steering rods 45, at least two pull rods 56 within the inner shaft 15, at least two upper upper-rotor steering rods 40, at least two upper tilted-arm pull rods 41 and at least two blade-clamp tilted arms 42 of the upper rotor to move, thus enabling the second blade clamping bodies to be twisted relative to the upper rotor hub 16. As such, with the method for driving a rotor provided by the embodiments of the present invention, the various components that are located between the screw-rod outer sleeve rod and the blade clamping body can operate jointly by controlling the rotary angle of the rotors to control the extending and shortening of the screw-rod outer sleeve rod in the actuator to which the rotor is connected, such that various elements between the screw-rod outer sleeve rod and a blade clamping body can be linked to drive the blade clamping body to twist relative to the hub, thus reducing the complexity of the rotor driving process and overcoming the drawback of complex driving process present in existing rotor driving methods of rotor driving systems.

Wherein, the first rotational state determining module 330 may comprise:

a current twist angle determining unit for determining a current twist angle by which each of the first blade clamping bodies rotates relative to the lower rotor hub 14 according to the current rotational states of the first motors 9; wherein, each of the first blade clamping bodies uniquely corresponds to one current twist angle;

a first twist angle determining unit for determining a required first twist angle by which each of the first blade clamping bodies rotates relative to the lower rotor hub 14 according to the command for flight control and the required current twist angle by which each of the first blade clamping bodies rotates relative to the lower rotor hub 14; wherein, each of the first blade clamping bodies uniquely corresponds to the first current twist angle; and a first rotational state determining unit for determining a required first rotational state of each of the first motors 9 according to the required first twist angle by which each of the first blade clamping bodies rotates relative to the lower rotor hub 14;

Correspondingly, the second rotational state determining module 340 may comprise:

a current angle determining unit for determining a current twist angle by which each of the second blade clamping bodies rotates relative to the upper rotor hub 16 according to the current rotational states of the second motors 49; wherein, each of the second blade clamping bodies uniquely corresponds to one current twist angle;

a second twist angle determining unit for determining a required second twist angle by which each of the second blade clamping bodies rotates relative to the upper rotor hub 16 according to the command for flight control and the current twist angle by which each of the second blade clamping bodies rotates relative to the upper rotor blade 16; wherein, each of the second blade clamping bodies uniquely corresponds to one second twist angle; and a second rotational state determining unit for determining a required second rotational state of each of the second motors 49 according to the required second twist angle by which each of the second blade clamping bodies rotates relative to the upper rotor hub 16.

The above description is only of the preferred embodiments of the present invention and is not intended to limit the present invention, and any modification, equivalent substitution and improvement and the like made within the spirit and principle of the present invention falls into the protection scope of the present invention.

What is claimed is:

1. A method for driving a rotor, which is applicable to a twin-rotor coaxial autonomous helicopter, characterized in that the twin-rotor coaxial autonomous helicopter comprises:

an outer shaft (19);

a lower rotor hub (14) fixed at outside of one end of the outer shaft (19);

at least two first blade clamping bodies that are connected with the lower rotor hub (14), each of the first blade clamping bodies is twistable relative to the lower rotor hub (14) and comprises a first blade clamp (20) and a second blade clamp (22), wherein, the first blade clamp (20) and the second blade clamp (22) cooperatively clamp the lower rotor blade;

an inner shaft (15);

an upper rotor hub (16) fixed at outside of one end of the inner shaft (15);

at least two second blade clamping bodies that are connected with the upper rotor hub (16), each of the second blade clamping bodies is twistable relative to the upper rotor hub (16) and comprises a third blade clamp (17) and a forth blade clamp (18), wherein the third blade clamp (17) and the forth blade clamp (18) cooperatively clamp the upper rotor blade;

a box, in which a gear train is housed, comprising an upper cover (26), a box body (27) and a lower cover (1), wherein, the gear train is connected with the outer shaft (19) and the inner shaft (15);

a synchronous belt wheel (7) that is connected with the gear train, wherein the rotation of the synchronous belt wheel drives the gear train to rotate so as to drive the outer shaft (19) and the inner shaft (15) to rotate, and wherein the outer shaft (19) rotates reversely relative to the inner shaft (15), the lower rotor hub (14) is stationary relative to the outer shaft (19) and the upper rotor hub (16) is stationary relative to the inner shaft (15);

a rotor driving system constituted by an upper-rotor driving system and a lower-rotor driving system;

the rotor driving method comprises:

receiving a command for flight control;

obtaining current rotational states of first motors (9) corresponding to at least three first actuators (8) in the lower-rotor driving system and current rotational states of second motors (49) corresponding to at least three second actuators (58) in the upper-rotor driving system; wherein, each of the first actuators (8) uniquely corresponds to one first motor (9), each of the second actuators (58) uniquely corresponds to one second motor (49), and each of the first motors (9) uniquely corresponds to one current rotational state, each of the second motors (49) uniquely corresponds to one current rotational state;

determining required first rotational states of the first motors (9) according to the command for flight control and the current rotational states of the first motors (9); wherein, each of the first motors (9) uniquely corresponds to one first rotational state;

determining required second rotational states of the second motors (49) according to the command for flight control and the current rotational states of the second motors (49); wherein, each of the second motors (49) uniquely corresponds to one second rotational state;

controlling the first motor (9) to rotate in a corresponding first rotational state, such that a first screw-rod outer sleeve rod (65) of each of the first actuators (8) extends, shortens or remains stationary as rotation of the corresponding first motor (9) so as to drive a nonrotating lower-rotor swashplate (11) in the lower-rotor driving system to tilt towards a specific direction and thus drive a rotating lower-rotor swashplate (24), at least two lower tilted-arm pull rods (35) and at least two blade-clamp tilted arms (13) of the lower rotor to move, enabling twisting of the first blade clamping bodies relative to the lower rotor hub (14); wherein, each of the first actuators (8) comprises a housing; and a first screw-rod outer sleeve rod (65), with one end located in the housing, the first screw-rod outer sleeve rod (65) is able to be telescoped upward and downward, the end of each first screw-rod outer sleeve rod (65) that protrudes out of the housing is connected with the nonrotating lower-rotor swashplate (11); the rotating lower-rotor swashplate (24) is sleeved on the nonrotating lower-rotor swashplate (11), and the nonrotating lower-rotor swashplate (11) is connected with the rotating lower-rotor swashplate (24) via a lower-rotor joint bearing (57), and the rotating lower-rotor swashplate (24) and the nonrotating lower-rotor swashplate (11) are able to rotate independently from each other; one end of each of the blade-clamp tilted arms (13) of the lower rotor is fixed on a preset mounting surface of the corresponding first blade clamping body; one end of each of the lower tilted-arm pull rods (35) is connected with the other end of the corresponding blade-clamp tilted arm (13) of the lower rotor; the rotating lower-rotor swashplate (24) is connected with the other end of each of the lower tilted-arm pull rods (35);

controlling the second motor (49) to rotate in a corresponding second rotational state, such that a second screw-rod outer sleeve rod (28) of each of the second actuators (58) extends, shortens or remains stationary as rotation of the corresponding second motor (49) so as to drive a nonrotating upper-rotor swashplate (3) in the upper-rotor driving system to tilt towards a specific direction and thus drive a rotating upper-rotor swashplate (4), at least two upper-rotor steering rod—L arms (47), at least two lower upper-rotor steering rods (45), at least two pull rods (56) within the inner shaft (15), at least two upper upper-rotor steering rods (40), at least two upper tilted-arm pull rods (41) and at least two blade-clamp tilted arms (42) of the upper rotor to move, enabling twisting of the second blade clamping bodies relative to the upper rotor hub (16); wherein, each of the second actuators (58) comprises a housing; and a second screw-rod outer sleeve rod (28) with one end located in the housing, the second screw-rod outer sleeve rod (28) is able to be telescoped upward and downward, the end of each second screw-rod outer sleeve rod (28) that protrudes out of the housing is connected with the nonrotating upper-rotor swashplate (3); the nonrotating upper-rotor swashplate (3) is connected with the rotating upper-rotor swashplate (4) and the rotating upper-rotor swashplate (4) and the nonrotating upper-rotor swashplate (3) are able to rotate independently from each other; one end of each of the blade-clamp tilted arms (42) of the upper rotor is fixed on a preset mounting surface of the corresponding second blade clamping body; one end of each of the upper tilted-arm pull rods (41) is connected with the other end of the corresponding blade-clamp tilted arm (42) of the upper rotor; one end of each of the upper upper-rotor steering rods (40) is connected with the other end of the corresponding upper tilted-arm pull rod (41); an upper pull-rod plug (39) that is connected with the other end of each of the upper upper-rotor steering rods (40); one end of each of the pull rods (56) is connected with the corresponding upper upper-rotor steering rod (40) by the upper pull-rod plug (39); one end of the lower pull-rod plug (64) is connected with the other end of the pull rod (56); one end of each of the lower upper-rotor steering rods (45) is connected with the lower pull-rod plug (64), and is connected with the other end of the corresponding pull rod (56) by the lower pull-rod plug (64); one end of each of the upper-rotor steering rod—L arms (47) is connected with the other end of the corresponding lower upper-rotor steering rod (45); the rotating upper-rotor swashplate (4) is connected with the other end of the upper-rotor steering rod—L arms (47);

wherein, under action of at least two lower-rotor steering assemblies in the lower-rotor driving system, the rotation of the lower rotor hub (14) with the outer shaft (19) drives the rotating lower-rotor swashplate (24) to rotate; under action of the upper-rotor steering rod—L arms (47) and the lower-rotor steering rods (45), the rotation of the upper rotor hub (16) with the inner shaft (15) drives the rotating upper-rotor swashplate (4) to rotate; wherein, one end of each of the lower-rotor steering assemblies is fixed on the lower rotor hub (14) and the other end is fixed on the rotating lower-rotor swashplate (24);

the nonrotating lower-rotor swashplate (11) is not rotatable with the rotating lower-rotor swashplate (24) under action of a first anti-rotation rod (25) and a first sliding block (44) in the lower-rotor driving system; the nonrotating upper-rotor swashplate (3) is not rotatable with the rotating upper-rotor swashplate (4) under action of a second anti-rotation rod (29) and a second sliding block (30) in the upper-rotor driving system; wherein, one end of the first anti-rotation rod (25) is fixed on the upper cover (26) and the other end is provided with a through hole, and the first sliding block (44) is arranged on the nonrotating lower-rotor swashplate (11) and penetrates into the through hole of the first anti-rotation rod (25); one end of the second anti-rotation rod (29) is fixed on a actuator mounting base (2) and the other end is provided with a through hole, and the second sliding block (30) is arranged on the nonrotating upper-rotor swashplate (3) and penetrates into the through hole of the second anti-rotation rod (29).

2. The method according to claim 1, characterized in that the command for flight control is:
a takeoff command, a hover command, a forward command, a reverse command, a left steering command or a right steering command.

3. The method according to claim 1, characterized in that, the step of determining required first rotational states of the first motors (9) according to the command for flight control and the current rotational states of the first motors (9) comprises:
determining a current twist angle by which each of the first blade clamping bodies rotates relative to the lower rotor hub (14) according to the current rotational states of the first motors (9); wherein, each of the first blade clamping bodies uniquely corresponds to one current twist angle;
determining a required first twist angle by which each of the first blade clamping bodies rotates relative to the lower rotor hub (14) according to the command for flight control and the current twist angle by which each of the first blade clamping bodies rotates relative to the lower rotor hub (14); wherein, each of the first blade clamping bodies uniquely corresponds to one first twist angle;
determining a required first rotational state of each of the first motors (9) according to the required first twist angle by which each of the first blade clamping bodies rotates relative to the lower rotor hub (14);
correspondingly, the step of determining required second rotational states of the second motors (49) according to the command for flight control and the current rotational states of the second motors (49) comprises:
determining a current twist angle by which each of the second blade clamping bodies rotates relative to the upper rotor hub (16) according to the current rotational states of the second motors (49); wherein, each of the second blade clamping bodies uniquely corresponds to one current twist angle;
determining a required second twist angle by which each of the second blade clamping bodies rotates relative to the upper rotor hub (16) according to the command for flight control and the current twist angle by which each of the second blade clamping bodies rotates relative to the upper rotor blade (16); wherein, each of the second blade clamping bodies uniquely corresponds to one second twist angle;

determining a required second rotational state of each of the second motors (49) according to the required second twist angle by which each of the second blade clamping bodies rotates relative to the upper rotor hub (16).

4. The method according to claim 1, characterized in that the command for flight control is sent by a remote controller.

5. The method according to claim 1, characterized in that the command for flight control is sent through a ground control station.

6. A rotor driving device, which is applicable to a twin-rotor coaxial autonomous helicopter, characterized in that the twin-rotor coaxial autonomous helicopter comprises:

an outer shaft (19);

a lower rotor hub (14) fixed at outside of one end of the outer shaft (19);

at least two first blade clamping bodies that are connected with the lower rotor hub (14), each of the first blade clamping bodies is twistable relative to the lower rotor hub (14) and comprises a first blade clamp (20) and a second blade clamp (22), wherein, the first blade clamp (20) and the second blade clamp (22) cooperatively clamp the lower rotor blade;

an inner shaft (15);

an upper rotor hub (16) fixed at outside of one end of the inner shaft (15);

at least two second blade clamping bodies that are connected with the upper rotor hub (16), each of the second blade clamping bodies is twistable relative to the upper rotor hub (16) and comprises a third blade clamp (17) and a forth blade clamp (18), wherein, the third blade clamp (17) and the forth blade clamp (18) cooperatively clamp the upper rotor blade;

a box, in which a gear train is housed, comprising an upper cover (26), a box body (27) and a lower cover (1), wherein, the gear train is connected with the outer shaft (19) and the inner shaft (15);

a synchronous belt wheel (7) that is connected with the gear train, wherein the rotation of the synchronous belt wheel drives the gear train to rotate so as to drive the outer shaft (19) and the inner shaft (15) to rotate, and wherein the outer shaft (19) rotates reversely relative to the inner shaft (15), the lower rotor hub (14) is stationary relative to the outer shaft (19) and the upper rotor hub (16) is stationary relative to the inner shaft (15);

a rotor driving system constituted by an upper-rotor driving system and a lower-rotor driving system;

the rotor driving device comprises:

a command receiving module for receiving a command for flight control;

a current state obtaining module for obtaining current rotational states of first motors (9) corresponding to at least three first actuators (8) in the lower-rotor driving system and current rotational states of second motors (49) corresponding to at least three second actuators (58) in the upper-rotor driving system; wherein, each of the first actuators (8) uniquely corresponds to one first motor (9), each of the second actuators (58) uniquely corresponds to one second motor (59), and each of the first motors (9) uniquely corresponds to one current rotational state, each of the second motors (49) uniquely corresponds to one current rotational state;

a first rotational state determining module for determining required first rotational states of the first motors (9) according to the command for flight control and the current rotational states of the first motors (9); wherein, each of the first motors (9) uniquely corresponds to one first rotational state;

a second rotational state determining module for determining required second rotational states of the second motors (49) according to the command for flight control and the current rotational states of the second motors (49); wherein, each of the second motors (49) uniquely corresponds to one second rotational state;

a first control module for controlling the first motor (9) to rotate in a corresponding first rotational state, such that a first screw-rod outer sleeve rod (65) of each of the first actuators (8) extends, shortens or remains stationary as rotation of the corresponding first motor (9) so as to drive a nonrotating lower-rotor swashplate (11) in the lower-rotor driving system to tilt towards a specific direction and thus drive a rotating lower-rotor swashplate (24), at least two lower tilted-arm pull rods (35) and at least two blade-clamp tilted arms (13) of the lower rotor to move, enabling twisting of the first blade clamping bodies relative to the lower rotor hub (14); wherein, each of the first actuators (8) comprises a housing; and a first screw-rod outer sleeve rod (65) with one end located in the housing, the first screw-rod outer sleeve rod (65) is able to be telescoped upward and downward, the end of each first screw-rod outer sleeve rod (65) that protrudes out of the housing is connected with the nonrotating lower-rotor swashplate (11); the rotating lower-rotor swashplate (24) is sleeved on the nonrotating lower-rotor swashplate (11), and the nonrotating lower-rotor swashplate (11) is connected with the rotating lower-rotor swashplate (24) via a lower-rotor joint bearing (57), and the rotating lower-rotor swashplate (24) and the nonrotating lower-rotor swashplate (11) are able to rotate independently from each other; one end of each of the blade-clamp tilted arms (13) of the lower rotor is fixed on a preset mounting surface of the corresponding first blade clamping body; one end of each of the lower tilted-arm pull rods (35) is connected with the other end of the corresponding blade-clamp tilted arm (13) of the lower rotor; the rotating lower-rotor swashplate (24) is connected with the other end of each of the lower tilted-arm pull rods (35);

a second control module for controlling the second motor (49) to rotate in a corresponding second rotational state, such that a second screw-rod outer sleeve rod (28) of each of the second actuators (58) extends, shortens or remains stationary as rotation of the corresponding second motor (49) so as to drive a nonrotating upper-rotor swashplate (3) in the upper-rotor driving system to tilt towards a specific direction and thus drive a rotating upper-rotor swashplate (4), at least two upper-rotor steering rod—L arms (47), at least two lower upper-rotor steering rods (45), at least two pull rods (56) within the inner shaft (15), at least two upper upper-rotor steering rods (40), at least two upper tilted-arm pull rods (41), and at least two blade-clamp tilted arms (42) of the upper rotor to move, enabling twisting of the second blade clamping bodies relative to the upper rotor hub (16); wherein, each of the second actuators (58) comprises a housing; and a second screw-rod outer sleeve rod (28) with one end located in the housing, the second screw-rod outer sleeve rod (28) is able to be telescoped upward and downward, the end of each second screw-rod outer sleeve rod (28) that protrudes out of the housing is connected with the nonrotating upper-rotor swashplate (3); the nonrotating upper-rotor swashplate (3) is connected with the rotating upper-rotor swashplate (4) and the rotating upper-rotor swashplate (4) and the nonrotating upper-rotor swashplate (3) are able to rotate independently from each other; one end of each of the blade-clamp tilted arms (42) of the upper rotor is fixed on a preset mounting surface of the corresponding second blade clamping body; one end of each of the upper tilted-arm pull rods (41) is connected with the other end of the corresponding blade-clamp tilted arm (42) of the upper rotor; one end of each of the upper upper-rotor steering rods (40) is connected with the other end of the corresponding upper tilted-arm pull rod (41); an upper pull-rod plug (39) that is connected with the other end of each of the upper upper-rotor steering rods (40); one end of each of the pull rods (56) is connected with the corresponding upper upper-rotor steering rod (40) by the upper pull-rod plug (39); one end of the lower pull-rod plug (64) is connected with the other end of the pull rod (56); one end of each of the lower upper-rotor steering rods (45) is connected with the lower pull-rod plug (64), and is connected with the other end of the corresponding pull rod (56) by the lower pull-rod plug (64); one end of each of the upper-rotor steering rod—L arms (47) is connected with the other end of the corresponding lower upper-rotor steering rod (45); the rotating upper-rotor swashplate (4) is connected with the other end of the upper-rotor steering rod—L arms (47);

wherein, the rotation of the lower rotor hub (14) with the outer shaft (19) drives the rotating lower-rotor swashplate (24) to rotate under action of at least two lower-rotor steering assemblies in the lower-rotor driving system; the rotation of the upper rotor hub (16) with the inner shaft (15) drives the rotating upper-rotor swashplate (4) to rotate under action of the upper-rotor steering rod—L arms (47) and the lower upper-rotor steering rods (45); wherein, one end of each of the lower-rotor steering assemblies is fixed on the lower rotor hub (14) and the other end is fixed on the rotating lower-rotor swashplate (24);

the nonrotating lower-rotor swashplate (11) is not rotatable with the rotating lower-rotor swashplate (24) under action of a first anti-rotation rod (25) and a first sliding block (44) in the lower rotor driving system; the nonrotating upper-rotor swashplate (3) is not rotatable with the rotating upper-rotor swashplate (4) under action of a second anti-rotation rod (29) and a second sliding block (30) in the upper-rotor driving system; wherein, one end of the first anti-rotation rod (25) is fixed on the upper cover (26) and the other end is provided with a through hole, and the first sliding block (44) is arranged on the nonrotating lower-rotor swashplate (11) and penetrates into the through hole of the first anti-rotation rod (25); one end of the second anti-rotation rod (29) is fixed on a actuator mounting base (2) and the other end is provided with a through hole, and the second sliding block (30) is arranged on the nonrotating upper-rotor swashplate (3) and penetrates into the through hole of the second anti-rotation rod (29).

7. The device according to claim 6, characterized in that the first rotational state determining module comprises:

a current twist angle determining unit for determining a current twist angle by which each of the first blade clamping bodies rotates relative to the lower rotor hub (14) according to the current rotational states of the first motors (9); wherein, each of the first blade clamping bodies uniquely corresponds to one current twist angle;

a first twist angle determining unit for determining a required first twist angle by which each of the first blade clamping bodies rotates relative to the lower rotor hub (14) according to the command for flight control and the required current twist angle by which each of the first blade clamping bodies rotates relative to the lower rotor hub (14); wherein, each of the first blade clamping bodies uniquely corresponds to the first current twist angle;

a first rotational state determining unit for determining a required first rotational state of each of the first motors (9) according to the required first twist angle by which each of the first blade clamping bodies rotates relative to the lower rotor hub (14);

correspondingly, the second rotational state determining module comprises:

a current angle determining unit for determining a current twist angle by which each of the second blade clamping bodies rotates relative to the upper rotor hub (16) according to the current rotational states of the second motors (49); wherein, each of the second blade clamping bodies uniquely corresponds to one current twist angle;

a second twist angle determining unit for determining a required second twist angle by which each of the second blade clamping bodies rotates relative to the upper rotor hub (16) according to the command for flight control and the current twist angle by which each of the second blade clamping bodies rotates relative to the upper rotor blade (16); wherein, each of the second blade clamping bodies uniquely corresponds to one second twist angle;

a second rotational state determining unit for determining a required second rotational state of each of the second motors (49) according to the required second twist angle by which each of the second blade clamping bodies rotates relative to the upper rotor hub (16).

* * * * *